United States Patent
Liu et al.

(10) Patent No.: US 11,665,575 B2
(45) Date of Patent: May 30, 2023

(54) COMMUNICATION METHOD AND COMMUNICATIONS APPARATUS

(71) Applicant: HUAWEI TECHNOLOGIES CO., LTD., Guangdong (CN)

(72) Inventors: Jing Liu, Shanghai (CN); Lifeng Han, Shenzhen (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 17/081,858

(22) Filed: Oct. 27, 2020

(65) Prior Publication Data
US 2021/0045006 A1  Feb. 11, 2021

Related U.S. Application Data

(63) Continuation of application No. PCT/CN2019/084689, filed on Apr. 26, 2019.

(30) Foreign Application Priority Data

Apr. 28, 2018  (CN) .......................... 201810404964.0

(51) Int. Cl.
*H04W 28/02* (2009.01)
*H04W 76/11* (2018.01)
(Continued)

(52) U.S. Cl.
CPC ... *H04W 28/0263* (2013.01); *H04W 28/0268* (2013.01); *H04W 28/22* (2013.01); *H04W 76/11* (2018.02); *H04W 88/14* (2013.01)

(58) Field of Classification Search
CPC ......... H04W 28/0263; H04W 28/0252; H04W 28/0268; H04W 28/22; H04W 28/18;
(Continued)

(56) References Cited

U.S. PATENT DOCUMENTS

2010/0103863 A1* 4/2010 Ulupinar ............... H04W 40/22
  370/315
2011/0103294 A1* 5/2011 Liu ....................... H04W 76/15
  370/315
(Continued)

FOREIGN PATENT DOCUMENTS

CN  103609050 A  2/2014
CN  104717717 A  6/2015
(Continued)

OTHER PUBLICATIONS

Ericsson, ST-Ericsson, "TP to internal TR on relay architecture options," 3GPP TSG-RAN WG2 #67, R2-095336, Shenzhen, China, Aug. 24-28, 2009, 15 pages.
(Continued)

*Primary Examiner* — Sudesh M Patidar
(74) *Attorney, Agent, or Firm* — Fish & Richardson P.C.

(57) ABSTRACT

This application provides example communication methods and example communications apparatuses, to implement bearer mapping for user data transmission. One example method is applied to a wireless backhaul system having a first network and a second network of different RATs. The example method includes obtaining, by a first management network element in the wireless backhaul system, information about a first radio bearer of a terminal in the first network, where the information about the first radio bearer is used to indicate the first radio bearer. The first management network element can then determine a mapping relationship between the first radio bearer and a second radio bearer based on the information about the first radio bearer, where the second radio bearer is a radio bearer of the first device in the second network.

20 Claims, 20 Drawing Sheets

(51) Int. Cl.
*H04W 28/22* (2009.01)
*H04W 88/14* (2009.01)

(58) Field of Classification Search
CPC ..... H04W 28/24; H04W 76/11; H04W 76/12; H04W 76/16; H04W 88/14; H04W 84/047; H04L 29/06326; H04L 29/08576
See application file for complete search history.

(56) References Cited

U.S. PATENT DOCUMENTS

| | | | | |
|---|---|---|---|---|
| 2011/0235514 | A1* | 9/2011 | Huang | H04B 7/15528 370/235 |
| 2011/0267943 | A1* | 11/2011 | Huang | H04W 72/087 370/230 |
| 2012/0127863 | A1* | 5/2012 | Yi | H04W 28/0231 370/235 |
| 2012/0287845 | A1* | 11/2012 | Yi | H04W 16/26 370/315 |
| 2013/0203342 | A1* | 8/2013 | Morioka | H04B 7/15507 455/7 |
| 2014/0003328 | A1* | 1/2014 | Mildh | H04W 56/0045 370/315 |
| 2014/0036762 | A1 | 2/2014 | Al-Shalash | |
| 2014/0185517 | A1* | 7/2014 | Yi | H04W 16/26 370/315 |
| 2015/0043531 | A1 | 2/2015 | Masini et al. | |
| 2016/0066363 | A1* | 3/2016 | Zhang | H04W 72/08 370/315 |
| 2018/0124633 | A1* | 5/2018 | Hwang | H04W 28/0268 |
| 2019/0132749 | A1 | 5/2019 | Wei et al. | |
| 2020/0084003 | A1* | 3/2020 | Sun | H04L 5/0053 |
| 2021/0127319 | A1* | 4/2021 | Huang | H04W 40/02 |

FOREIGN PATENT DOCUMENTS

| | | |
|---|---|---|
| CN | 107466074 A | 12/2017 |
| CN | 107734571 A | 2/2018 |
| CN | WO2019184482 * | 12/2018 |
| WO | 2018029578 A1 | 2/2018 |
| WO | 2018044358 A1 | 3/2018 |

OTHER PUBLICATIONS

Extended European Search Report issued in European Application No. 19792917.7 dated May 7, 2021, 16 pages.
Nokia, Nokia Shanghai Bell, "Text Proposal for Data Forwarding at 4G to 5G Handover," 3GPP TSG-RAN WG3#98, R3-174525, Reno, USA, Nov. 27-Dec. 1, 2017, 4 pages.
KDDI Corporation, "Consideration on NSA operation in architectures, 1a, 1b and 2a," 3GPP TSG RAN WG2 #101bis, R2-1806198, Sanya, China, Apr. 16-20, 2018, 7 pages.
Huawei, "Overview on Support of IAB," 3GPP TSG-RAN WG3#99, R3-180815, Athens, Greece, Feb. 26-Mar. 2, 2018, 5 pages.
3GPP TR 38.874 V0.1.0 (Feb. 2018), "3rd Generation Partnership Project; Technical Specification Group Radio Access Network; Study on Integrated Access and Backhaul; (Release 15)," Feb. 2018, 11 pages.
3GPP TS 36.300 V15.1.0 (Mar. 2018), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 15)," Mar. 2018, 341 pages.
Office Action issued in Chinese Application No. 201810404964.0 dated Oct. 10, 2020, 25 pages (with English translation).
PCT International Search Report and Written Opinion issued in International Application No. PCT/CN2019/084689 dated Jul. 30, 2019, 15 pages (with English translation).

* cited by examiner

COMMUNICATION METHOD AND COMMUNICATIONS APPARATUS

CROSS-REFERENCE TO RELATED APPLICATIONS

This application is a continuation of International Patent Application No. PCT/CN2019/084689, filed on Apr. 26, 2019, which claims priority to Chinese Patent Application No. 201810404964.0, filed on Apr. 28, 2018. The disclosures of the aforementioned applications are hereby incorporated by reference in their entireties.

TECHNICAL FIELD

This application relates to the field of communications technologies, and in particular, to a communication method and a communications apparatus.

BACKGROUND

The concept of relay is introduced into the 3rd generation partnership project (3GPP) Release 10 (R10). As shown in FIG. 1, a relay node (RN) 102 is introduced between a terminal 103 and an access network device 101. The RN 102 accesses the access network device 101 through a wireless backhaul link, and the RN 102 communicates with the terminal 103 through a radio access link. For the terminal 103, the RN may be used as a cell managed by the access network device, and the RN performs forwarding between the terminal and the access network device based on an IP data packet. Wireless backhaul means that data is transmitted to a corresponding core network by using a radio access technology (RAT).

In a process in which the RN, serving as a terminal, accesses the access network device, a user plane core network device (for example, a data packet network gateway (PGW)) that is built in the access network device and that serves the RN triggers setup of an E-UTRAN radio access bearer (E-RAB) of the RN (which is at least a default bearer of the RN), so that a data radio bearer (DRB) between the RN and the access network device is set up. In a process in which the terminal accesses the access network device through the RN, as shown in a protocol stack shown in FIG. 2, the RN may learn of E-RAB information of the terminal by using an S1AP message sent by the terminal. In addition, through interaction on a control plane, the RN completes user plane bearer mapping of the terminal on each interface, including: mapping between a DRB that is between the terminal and the RN and a terminal-specific general packet radio service tunneling protocol (GTP) tunnel that is between the RN and the access network device, and mapping between the terminal-specific GTP tunnel that is between the RN and the access network device and a terminal-specific GTP tunnel that is between the access network device and a serving gateway (S-GW)/PGW of the terminal. In this way, in a process in which data is transmitted between the access network device and the terminal, for downlink data transmission of the terminal, the access network device may map downlink data to a corresponding bearer based on the user plane bearer mapping of the terminal on each interface, to transmit the downlink data to the terminal. For uplink data transmission of the terminal, the terminal may map uplink data to a corresponding bearer based on the user plane bearer mapping on each interface, to transmit the uplink data to the access network device. A corresponding user plane protocol stack is shown in FIG. 3.

However, an RN scenario is usually an inter-RAT scenario, to be specific, a radio access link and a wireless backhaul link use a same RAT. In the inter-RAT scenario, quality of service (QoS) is usually based on a bearer mapping manner at a same granularity. However, after new radio (NR) is introduced into the 3GPP R15 standard, an intra-RAT scenario may exist in integrated access and backhaul (IAB). To be specific, a radio access link and a wireless backhaul link use different RATs, and QoS in the different standards is usually based on bearer mapping manners at different granularities. For example, in a long term evolution (LTE) network, QoS is based on a bearer manner at an E-RAB granularity, to be specific, a DRB is set up between a terminal and an access network device, and a GTP tunnel is set up between the access network device and a core network device, where both the DRB and the GTP tunnel correspond one-to-one to an E-RAB, so that one-to-one mapping of data between the DRB that is between the terminal and the access network device and the GTP tunnel that is between the access network device and the core network device is implemented. In an NR network, QoS is based on bearer manner at a flow granularity. To be specific, a DRB is set up between a terminal and an access network device, and a GTP tunnel is set up between the access network device and a core network device, where the NR network includes a 5G network or a next generation network, the DRB corresponds one-to-one to a flow, the GTP tunnel may correspond to a plurality of flows, so that one-to-many mapping of data between the DRB that is between the terminal and the access network device and the GTP tunnel that is between the access network device and the core network device is implemented. Therefore, for an IAB different-standard scenario, bearer mapping manners at different granularities may cause differences in user plane bearer mapping of a terminal on various interfaces. If data is not mapped to a corresponding bearer, data transmission quality may deteriorate, and even a packet may be lost. Therefore, how to implement mapping between bearers at different granularities in a different-standard scenario is a technical problem that urgently needs to be resolved in a future communications system.

SUMMARY

This application provides a communication method and a communications apparatus, to implement bearer mapping for user data transmission in a different-standard scenario, thereby improving service transmission quality of a terminal.

A first aspect of this application provides a communication method, applied to a wireless backhaul system, where the wireless backhaul system includes a first network and a second network, the first network and the second network use different RATs, a terminal and an access network device in the wireless backhaul system communicate with each other through a first device in the wireless backhaul system, the first device communicates with the terminal by using a RAT corresponding to the first network, and the first device communicates with the access network device by using a RAT corresponding to the second network; and the method provided in this application includes: obtaining, by the first device, information about a first radio bearer of the terminal in the first network, where the information about the first radio bearer is used to indicate the first radio bearer; sending, by the first device, the information about the first radio bearer to a first management network element in the second network; and determining, by the first management network element, a mapping relationship between the first radio bearer and a second radio bearer based on the information about the first radio bearer, where the second radio bearer is a radio bearer of the first device in the second network.

According to the communication method provided in the first aspect of this application, the first device obtains the information about the first radio bearer of the terminal in the first network, and sends the obtained information about the first radio bearer of the terminal in the first network to the first management network element, so that after receiving the information about the first radio bearer, the first management network element may determine the mapping relationship between the first radio bearer and the second radio bearer of the first device in the second network based on the information about the first radio bearer. In this way, in a different-standard scenario, a service of the terminal can be mapped to the corresponding bearers in the first network and the second network for transmission, thereby improving service transmission quality.

In a possible design, the information about the first radio bearer includes an identifier of the first radio bearer and a quality of service (QoS) parameter corresponding to the identifier of the first radio bearer.

In a possible design, the RAT corresponding to the first network is an LTE network, and the RAT corresponding to the second network is an NR network.

In a possible design, the QoS parameter corresponding to the identifier of the first radio bearer includes one or more of the following: a quality of service class identifier (QCI), an allocation and retention priority (ARP), a guaranteed bit rate (GBR), and a maximum bit rate (MBR); and an identifier of the second radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the RAT corresponding to the first network is an NR network, and the RAT corresponding to the second network is an LTE network.

In a possible design, a QoS parameter corresponding to an identifier of the second radio bearer includes one or more of the following: a quality of service class identifier (QCI), an allocation and retention priority (ARP), a guaranteed bit rate (GBR), and a maximum bit rate (MBR); and the identifier of the the first radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the first device receives the mapping relationship that is between the first radio bearer and the second radio bearer and that is sent by the first management network element. The first device receives the mapping relationship, so that in a process in which the first device communicates (for example, exchanges data or signaling) with the terminal, the first device may map, to the corresponding second radio bearer, a terminal service transmitted on the first radio bearer, to send the terminal service to the access network device; or the access network device may map, to the corresponding second radio bearer, a terminal service transmitted on the first radio bearer, to send the terminal service to the first device. In this way, with reference to a bearer for data or signaling to be sent by the access network device to the terminal and the mapping relationship, the data or the signaling to be sent by the access network device to the terminal is mapped to a bearer that has a mapping relationship with a bearer for data or signaling to be sent by the access network device to the first device and is transmitted to the terminal. In addition, in a process in which the terminal communicates with the access network device, data or signaling to be sent by the terminal may be mapped, based on a bearer for the data or the signaling to be sent by the terminal and the mapping relationship, a specified bearer that has a mapping relationship with a bearer for data or signaling to be sent by the first device, and is uploaded to the access network device. In this way, data transmission quality can be improved.

In a possible design, the first device has a first protocol stack and a second protocol stack, and the first protocol stack and the second protocol stack are used for different RATs; when the first device communicates with the terminal by using the RAT corresponding to the first network, the first device uses the first protocol stack; and when the first device communicates with the access network device by using the RAT corresponding to the second network, the first device uses the second protocol stack.

A second aspect of this application provides a communication method, applied to a wireless backhaul system, where the wireless backhaul system includes a first network and a second network, the first network and the second network use different RATs, a terminal and an access network device in the wireless backhaul system communicate with each other through a first device in the wireless backhaul system, the first device communicates with the terminal by using a RAT corresponding to the first network, the first device communicates with the access network device by using a RAT corresponding to the second network, the second network includes a first management network element, and the first management network element is configured to control session management of the first device in the second network; and the method provided in this application includes: obtaining, by the first management network element, information about a first radio bearer of the terminal in the first network, where the information about the first radio bearer is used to indicate the first radio bearer; and determining, by the first management network element, a mapping relationship between the first radio bearer and a second radio bearer based on the information about the first radio bearer, where the second radio bearer is a radio bearer of the first device in the second network.

According to the communication method provided in the second aspect of this application, the first management network element obtains the information about the first radio bearer of the terminal in the first network, and determines the mapping relationship between the first radio bearer and the second radio bearer of the first device in the second network based on the obtained information about the first radio bearer of the terminal in the first network. The first management network element determines the mapping relationship, so that in a different-standard scenario, the access network device may map, based on the mapping relationship, a service of the terminal to the corresponding bearer in the second network, and transmit the service to the first device; or the first device maps, to the corresponding bearer in the second network, a service sent by the terminal, and transmits the service to the access network device, thereby improving service transmission quality.

In a possible design, the obtaining, by the first management network element, information about a first radio bearer of the terminal in the first network includes: obtaining, by the first management network element, the information about the first radio bearer of the terminal in the first network from the first device; or obtaining, by the first management network element, the information about the first radio bearer of the terminal in the first network from a core network control plane network element of the terminal in the first network. According to the method, the first management network element can flexibly obtain the information about the first radio bearer of the terminal in the first network.

In a possible design, before the first management network element obtains the mapping relationship between the first radio bearer and the second radio bearer of the first device in the second network based on the information about the first radio bearer, the method provided in this application further includes: obtaining, by the first management network element, information about the second radio bearer of the first device in the second network, where the information about the second radio bearer includes an identifier of the second radio bearer and a quality of service (QoS) parameter corresponding to the identifier of the second radio bearer.

In a possible design, the information about the first radio bearer includes an identifier of the first radio bearer and a quality of service (QoS) parameter corresponding to the identifier of the first radio bearer, and the determining, by the first management network element, a mapping relationship between the first radio bearer and a second radio bearer based on the information about the first radio bearer includes: searching, by the first management network element based on the QoS parameter corresponding to the identifier of the first radio bearer, the second network for a QoS parameter that matches the QoS parameter corresponding to the identifier of the first radio bearer; and if the QoS parameter corresponding to the identifier of the first radio bearer matches the QoS parameter corresponding to the identifier of the second radio bearer, determining, by the first management network element, that a mapping relationship exists between the identifier of the first radio bearer and the identifier of the second radio bearer; or if no QoS parameter that matches the QoS parameter corresponding to the identifier of the first radio bearer exists in the second network, triggering, by the first management network element based on the QoS parameter corresponding to the identifier of the first radio bearer, the first device to set up a second radio bearer in the second network, where the second radio bearer is indicated by an identifier of the second radio bearer and a QoS parameter corresponding to the identifier of the second radio bearer; and determining, by the first management network element, that a mapping relationship exists between the identifier of the first radio bearer and the identifier of the second radio bearer. The mapping relationship between the identifier of the first radio bearer and the identifier of the second radio bearer is set up based on the QoS parameter, so that bearers based on different granularities (for example, a bearer based on an E-RAB granularity and a bearer based on a QoS flow granularity) can be converted, thereby ensuring service quality of data transmission of the terminal. In addition, when the QoS parameter that matches the QoS parameter corresponding to the identifier of the first radio bearer exists in the second network, a mapping relationship between the identifier of the first radio bearer and the identifier of the second radio bearer associated with the QoS parameter that matches the QoS parameter corresponding to the identifier of the first radio bearer is set up. This facilitates conversion between bearers at different granularities. In addition, when no QoS parameter that matches the QoS parameter corresponding to the identifier of the first radio bearer exists in the second network, the second radio bearer is set up based on the QoS parameter corresponding to the identifier of the first radio bearer, and the mapping relationship between the identifier of the second radio bearer that is newly set up and the identifier of the first radio bearer is set up, so that data transmission reliability is improved.

In a possible design, the RAT corresponding to the first network is an LTE network, and the RAT corresponding to the second network is an NR network.

In a possible design, the QoS parameter corresponding to the identifier of the first radio bearer includes one or more of the following: a quality of service class identifier (QCI), an allocation and retention priority (ARP), a guaranteed bit rate (GBR), and a maximum bit rate (MBR); and the identifier of the second radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the RAT corresponding to the first network is an NR network, and the RAT corresponding to the second network is an LTE network.

In a possible design, the QoS parameter corresponding to the identifier of the second radio bearer includes one or more of the following: a quality of service class identifier (QCI), an allocation and retention priority (ARP), a guaranteed bit rate (GBR), and a maximum bit rate (MBR); and the identifier of the first radio bearer is a quality of service flow identifier QFI, and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the first management network element sends the mapping relationship between the first radio bearer and the second radio bearer of the first device in the second network to the first device and/or the access network device. The mapping relationship is sent, so that in the different-standard scenario, the access network device may map, based on the mapping relationship, the service of the terminal to the corresponding bearer in the second network, and transmit the service to the first device; or the first device maps, to the corresponding bearer in the second network, the service sent by the terminal, and transmits the service to the access network device, thereby improving the service transmission quality.

A third aspect of this application provides a communications apparatus, where the communications apparatus can implement the method according to any one of the first aspect or the possible implementations of the first aspect, and therefore can further implement beneficial effects according to any one of the first aspect or the possible implementations of the first aspect. The communications apparatus may be a first device, for example, a relay device; or may be a chip applied to a first device. The foregoing method may be implemented by software, hardware, or hardware executing corresponding software.

The communications apparatus is applied to a wireless backhaul system, where the communications apparatus may be the first device or the chip applied to the first device, the wireless backhaul system includes a first network and a second network, the first network and the second network use different RATs, a terminal and an access network device in the wireless backhaul system communicate with each other through a first device in the wireless backhaul system, the apparatus communicates with the terminal by using a RAT corresponding to the first network, and the communications apparatus communicates with the access network device by using a RAT corresponding to the second network; and the communications apparatus provided in this application includes: an obtaining unit, configured to obtain information about a first radio bearer of the terminal in the first network, where the information about the first radio bearer is used to indicate the first radio bearer; and a sending unit, configured to send the information about the first radio bearer to a first management network element in the second network, so that the first management network element determines a mapping relationship between the first radio bearer and a second radio bearer based on the information about the first radio bearer, where the second radio bearer is a radio bearer of the communications apparatus in the second network.

In a possible design, the information about the first radio bearer includes an identifier of the first radio bearer and a quality of service (QoS) parameter corresponding to the identifier of the first radio bearer.

In a possible design, the RAT corresponding to the first network is an (LTE) network, and the RAT corresponding to the second network is an NR network.

In a possible design, the QoS parameter corresponding to the identifier of the first radio bearer includes one or more of the following: a quality of service class identifier (QCI), an allocation and retention priority (ARP), a guaranteed bit rate (GBR), and a maximum bit rate (MBR); and an identifier of the second radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the RAT corresponding to the first network is an NR network, and the RAT corresponding to the second network is an LTE network.

In a possible design, a QoS parameter corresponding to an identifier of the second radio bearer includes one or more of the following: a quality of service class identifier (QCI), an allocation and retention priority (ARP), a guaranteed bit rate (GBR), and a maximum bit rate (MBR); and the identifier of the first radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the communications apparatus further includes: a receiving unit, configured to receive the mapping relationship that is between the first radio bearer and the second radio bearer and that is sent by the first management network element.

In a possible design, the communications apparatus has a first protocol stack and a second protocol stack, and the first protocol stack and the second protocol stack are used for different RATs; when the communications apparatus communicates with the terminal by using the RAT corresponding to the first network, the communications apparatus uses the first protocol stack; and when the communications apparatus communicates with the access network device by using the RAT corresponding to the second network, the communications apparatus uses the second protocol stack.

A fourth aspect of this application provides a communications apparatus. The communications apparatus may be applied to a wireless backhaul system, where the communications apparatus may be a first device or a chip applied to a first device, the wireless backhaul system includes a first network and a second network, the first network and the second network use different RATs, a terminal and an access network device in the wireless backhaul system communicate with each other through the communications apparatus in the wireless backhaul system, the communications apparatus communicates with the terminal by using a RAT corresponding to the first network, and the communications apparatus communicates with the access network device by using a RAT corresponding to the second network; and the communications apparatus provided in this application includes a communications interface and a processor, where the processor is configured to obtain information about a first radio bearer of the terminal in the first network through the communications interface, where the information about the first radio bearer is used to indicate the first radio bearer; and the communications interface is configured to send the information about the first radio bearer to a first management network element in the second network, so that the first management network element determines a mapping relationship between the first radio bearer and a second radio bearer based on the information about the first radio bearer, where the second radio bearer is a radio bearer of the communications apparatus in the second network.

In a possible design, the RAT corresponding to the first network is an LTE network, and the RAT corresponding to the second network is an NR network.

In a possible design, a QoS parameter corresponding to an identifier of the first radio bearer includes one or more of the following: a quality of service class identifier (QCI), an allocation and retention priority (ARP), a guaranteed bit rate (GBR), and a maximum bit rate (MBR); and an identifier of the second radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the RAT corresponding to the first network is an NR network, and the RAT corresponding to the second network is an LTE network.

In a possible design, a QoS parameter corresponding to an identifier of the second radio bearer includes one or more of the following: a quality of service class identifier (QCI), an allocation and retention priority (ARP), a guaranteed bit rate (GBR), and a maximum bit rate (MBR); and an identifier of the first radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the communications interface is further configured to receive the mapping relationship that is between the first radio bearer and the second radio bearer and that is sent by the first management network element.

In a possible design, the communications apparatus has a first protocol stack and a second protocol stack, and the first protocol stack and the second protocol stack are used for different RATs; when the communications apparatus communicates with the terminal by using the RAT corresponding to the first network, the communications apparatus uses the first protocol stack; and when the communications apparatus communicates with the access network device by using the RAT corresponding to the second network, the communications apparatus uses the second protocol stack.

In a possible design, the information about the first radio bearer includes the identifier of the first radio bearer and the quality of service (QoS) parameter corresponding to the identifier of the first radio bearer.

Optionally, the communications interface and the processor of the communications apparatus are coupled to each other.

Optionally, the communications apparatus further includes a memory, where the memory is configured to store code and data; and the processor, the communications interface, and the memory are coupled to each other.

A fifth aspect of this application provides a communications apparatus, where the communications apparatus can implement the method according to any one of the second aspect or the possible implementations of the second aspect, and therefore can further implement beneficial effects according to any one of the second aspect or the possible implementations of the second aspect. The communications apparatus may be a first management network element, or may be a chip applied to a first management network element. The foregoing method may be implemented by software, hardware, or hardware executing corresponding software.

The communications apparatus is applied to a wireless backhaul system, where the communications apparatus is the first management network element or the chip applied to the first management network element, the wireless backhaul system includes a first network and a second network, the first network and the second network use different RATs, a terminal and an access network device in the wireless backhaul system communicate with each other through the communications apparatus, the communications apparatus communicates with the terminal by using a RAT corresponding to the first network, the communications apparatus communicates with the access network device by using a RAT corresponding to the second network, the communications apparatus is configured to control session management of a first device in the second network, and the access network device is used by the first device to access the second network; and the communications apparatus provided in this application includes: an obtaining unit, configured to obtain information about a first radio bearer of the terminal in the first network, where the information about the first radio bearer is used to indicate the first radio bearer; and a determining unit, configured to determine a mapping relationship between the first radio bearer and a second radio bearer based on the information about the first radio bearer, where the second radio bearer is a radio bearer of the first device in the second network.

In a possible design, the obtaining unit is specifically configured to obtain the information about the first radio bearer of the terminal in the first network from the first device; or the obtaining unit is specifically configured to obtain the information about the first radio bearer of the terminal in the first network from a corresponding core network control plane network element of the terminal in the first network.

In a possible design, the obtaining unit is further configured to obtain information about the second radio bearer of the first device in the second network, where the information about the second radio bearer includes an identifier of the second radio bearer and a QoS parameter corresponding to the identifier of the second radio bearer.

In a possible design, the information about the first radio bearer includes an identifier of the first radio bearer and a quality of service (QoS) parameter corresponding to the identifier of the first radio bearer, and the determining unit provided in this application is further configured to search, based on the QoS parameter corresponding to the identifier of the first radio bearer, the second network for a QoS parameter that matches the QoS parameter corresponding to the identifier of the first radio bearer; and if the QoS parameter corresponding to the identifier of the first radio bearer matches the QoS parameter corresponding to the identifier of the second radio bearer, the determining unit is further configured to determine that a mapping relationship exists between the identifier of the first radio bearer and the identifier of the second radio bearer; or if no QoS parameter that matches the QoS parameter corresponding to the identifier of the first radio bearer exists in the second network, the communications apparatus further includes a processing unit, configured to trigger, based on the QoS parameter corresponding to the identifier of the first radio bearer, the communications apparatus to set up a second radio bearer in the second network, where the second radio bearer is indicated by an identifier of the second radio bearer and a QoS parameter corresponding to the identifier of the second radio bearer; and the determining unit is further configured to determine that a mapping relationship exists between the identifier of the first radio bearer and the identifier of the second radio bearer.

In a possible design, the RAT corresponding to the first network is an LTE network, and the RAT corresponding to the second network is an NR network.

In a possible design, the QoS parameter corresponding to the identifier of the first radio bearer includes one or more of the following: a quality of service class identifier (QCI), an allocation and retention priority (ARP), a guaranteed bit rate (GBR), and a maximum bit rate (MBR); and the identifier of the second radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the RAT corresponding to the second network is an LTE network, and the RAT corresponding to the first network is an NR network.

In a possible design, the QoS parameter corresponding to the identifier of the second radio bearer includes one or more of the following: a quality of service class identifier (QCI), an allocation and retention priority (ARP), a guaranteed bit rate (GBR), and a maximum bit rate (MBR); and the identifier of the first radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the apparatus provided in this application further includes a sending unit, configured to send the mapping relationship between the first radio bearer and the second radio bearer of the first device in the second network to the first device and/or the access network device.

A sixth aspect of this application provides a communications apparatus, applied to a wireless backhaul system, where the communications apparatus is a first management network element or a chip applied to a first management network element, the wireless backhaul system includes a first network and a second network, the first network and the second network use different RATs, a terminal and an access network device in the wireless backhaul system communicate with each other through the communications apparatus, a first device communicates with the terminal by using a RAT corresponding to the first network, the first device communicates with the access network device by using a RAT corresponding to the second network, the communications apparatus is configured to control session management of the first device in the second network, and the access network device is used by the first device to access the second network; and the communications apparatus provided in this application includes a communications interface and a processor, where the communications interface is configured to obtain information about a first radio bearer of the terminal in the first network, where the information about the first radio bearer is used to indicate the first radio bearer; and the processor is configured to obtain a mapping relationship between the first radio bearer and a second radio bearer based on the information about the first radio bearer, where the second radio bearer is a radio bearer of the first device in the second network.

In a possible design, the communications interface is configured to obtain the information about the first radio bearer of the terminal in the first network from the first device; or the communications interface is configured to obtain the information about the first radio bearer of the terminal in the first network from a core network control plane network element of the terminal in the first network.

In a possible design, the communications interface is further configured to obtain information about the second radio bearer of the first device in the second network, where the information about the second radio bearer includes an identifier of the second radio bearer and a QoS parameter corresponding to the identifier of the second radio bearer.

In a possible design, the information about the first radio bearer includes an identifier of the first radio bearer and a quality of service (QoS) parameter corresponding to the identifier of the first radio bearer, and the processor provided in this application is configured to search, based on the QoS parameter corresponding to the identifier of the first radio bearer, the second network for a QoS parameter that matches the QoS parameter corresponding to the identifier of the first radio bearer; and if the QoS parameter corresponding to the identifier of the first radio bearer matches the QoS parameter corresponding to the identifier of the second radio bearer, the processor is configured to determine that a mapping relationship exists between the identifier of the first radio bearer and the identifier of the second radio bearer; or if no QoS parameter that matches the QoS parameter corresponding to the identifier of the first radio bearer exists in the second network, the processor is configured to trigger, based on the QoS parameter corresponding to the identifier of the first radio bearer, the communications apparatus to set up a second radio bearer in the second network, where the second radio bearer is indicated by an identifier of the second radio bearer and a QoS parameter corresponding to the identifier of the second radio bearer; and the processor is further configured to determine that a mapping relationship exists between the identifier of the first radio bearer and the identifier of the second radio bearer.

In a possible design, the RAT corresponding to the first network is an LTE network, and the RAT corresponding to the second network is an NR network.

In a possible design, the QoS parameter corresponding to the identifier of the first radio bearer includes one or more of the following: a quality of service class identifier (QCI), an allocation and retention priority (ARP), a guaranteed bit rate (GBR), and a maximum bit rate (MBR); and the identifier of the second radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the RAT corresponding to the second network is an LTE network, and the RAT corresponding to the first network is an NR network.

In a possible design, the QoS parameter corresponding to the identifier of the second radio bearer includes one or more of the following: a quality of service class identifier (QCI), an allocation and retention priority (ARP), a guaranteed bit rate (GBR), and a maximum bit rate (MBR); and the identifier of the first radio bearer is a quality of service flow identifier (QFI), and a QoS parameter corresponding to the QFI includes one or more of the following: a 5G QoS identifier (5QI), an allocation and retention priority (ARP), a guaranteed bit rate (GBR), and a maximum bit rate (MBR).

In a possible design, the communications interface provided in this application is configured to send the mapping relationship between the first radio bearer and the second radio bearer to the first device and/or the access network device.

Optionally, the communications interface and the processor of the communications apparatus are coupled to each other.

Optionally, the communications apparatus further includes a memory, where the memory is configured to store code and data; and the processor, the receiver, and the memory are coupled to each other.

A seventh aspect of this application provides a computer-readable storage medium, where the computer-readable storage medium stores a computer program or an instruction, and when the computer program or the instruction is run, the method according to any one of the first aspect to the possible implementations of the first aspect is implemented.

An eighth aspect of this application provides a computer-readable storage medium, where the computer-readable storage medium stores a computer program or an instruction, and when the computer program or the instruction is run, the method according to any one of the second aspect to the possible implementations of the second aspect is implemented.

A ninth aspect of this application provides a computer program product, where the computer program product includes a computer program or an instruction, and when the computer program or the instruction is run, the method according to any one of the first aspect to the possible implementations of the first aspect is implemented.

A tenth aspect of this application provides a computer program product, where the computer program product includes a computer program or an instruction, and when the computer program or the instruction is run, the method according to any one of the second aspect to the possible implementations of the second aspect is implemented.

An eleventh aspect of this application provides a chip, where the chip includes a processor and an interface circuit, the interface circuit is coupled to the processor, the processor is configured to run a computer program or an instruction to implement the method according to any one of the first aspect to the possible implementations of the first aspect, and the interface circuit is configured to communicate with a module other than the chip.

A twelfth aspect of this application provides a chip, where the chip includes a processor and an interface circuit, the interface circuit is coupled to the processor, the processor is configured to run a computer program or an instruction to implement the method according to any one of the second aspect to the possible implementations of the second aspect, and the interface circuit is configured to communicate with a module other than the chip.

Optionally, the chip described in this application may further include one or more (including two) memories, and the one or more memories store an instruction or a computer program.

According to a thirteenth aspect of this application, this application provides a wireless backhaul system, where the wireless backhaul system includes one or more apparatuses according to any one of the third aspect to the possible designs of the third aspect, and the communications apparatus according to any one of the fifth aspect to the possible implementations of the fifth aspect.

Certainly, it may be understood that the wireless backhaul system according to the thirteenth aspect may further include another communications apparatus, for example, an access network device or a terminal.

DESCRIPTION OF EMBODIMENTS

It should be noted that, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of a new service scenario, the technical solutions provided in the embodiments of this application are also applicable to a similar technical problem.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one of the following items (pieces)" or a similar expression means any combination of these items, including any combination of singular items (pieces) or plural items (pieces). For example, at least one (one piece) of a, b, or c may indicate: a, b, c, a-b, a-c, b-c, or a-b-c, where a, b, and c may be singular or plural.

Figure 1:
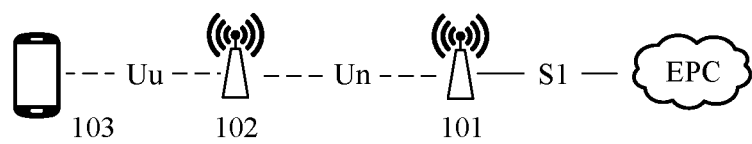
FIG. 1 is a schematic structural diagram of a wireless backhaul system.
Figure 2:
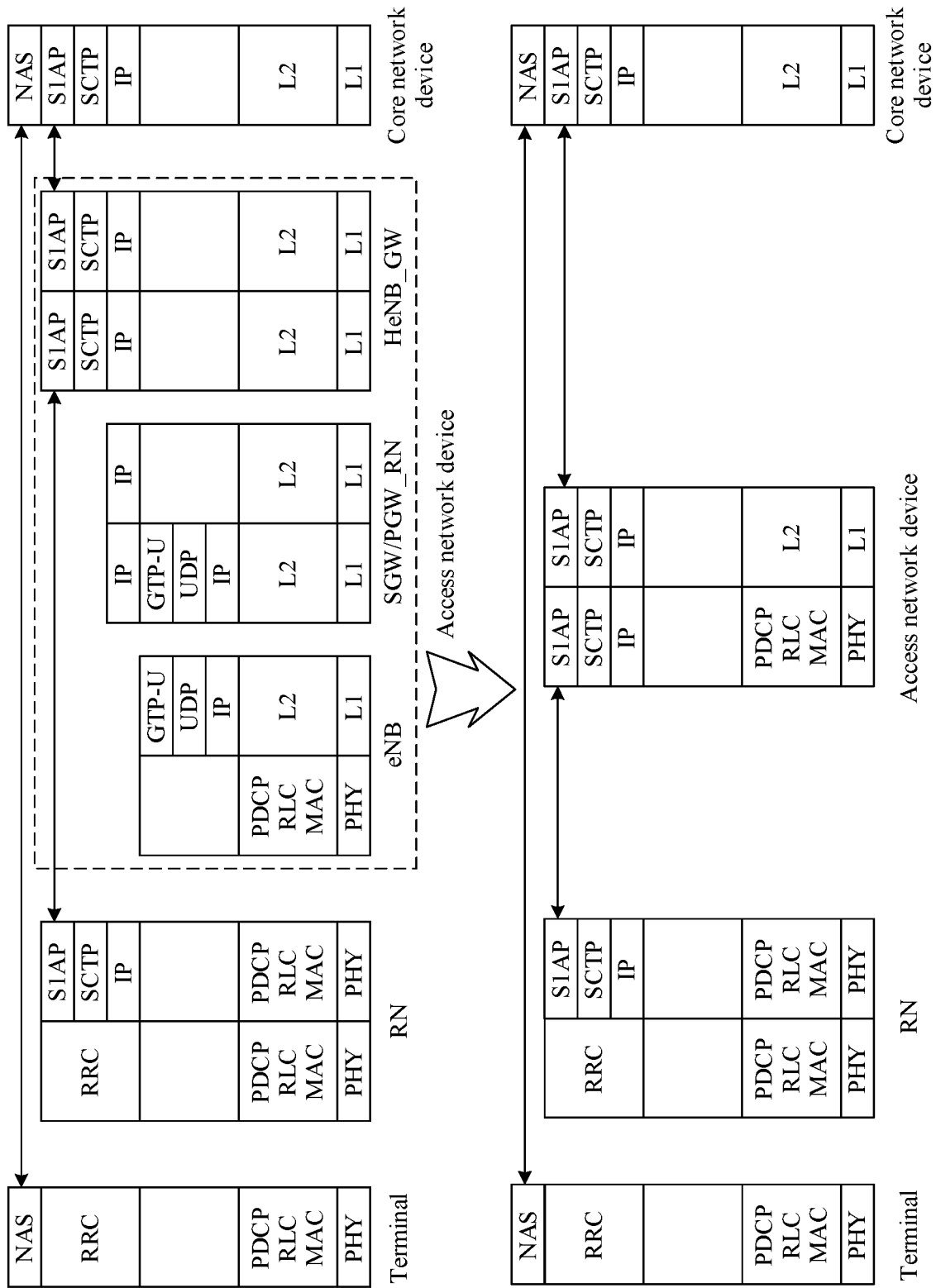
FIG. 2 is a schematic architectural diagram of a control plane protocol stack in the prior art.
Figure 3:
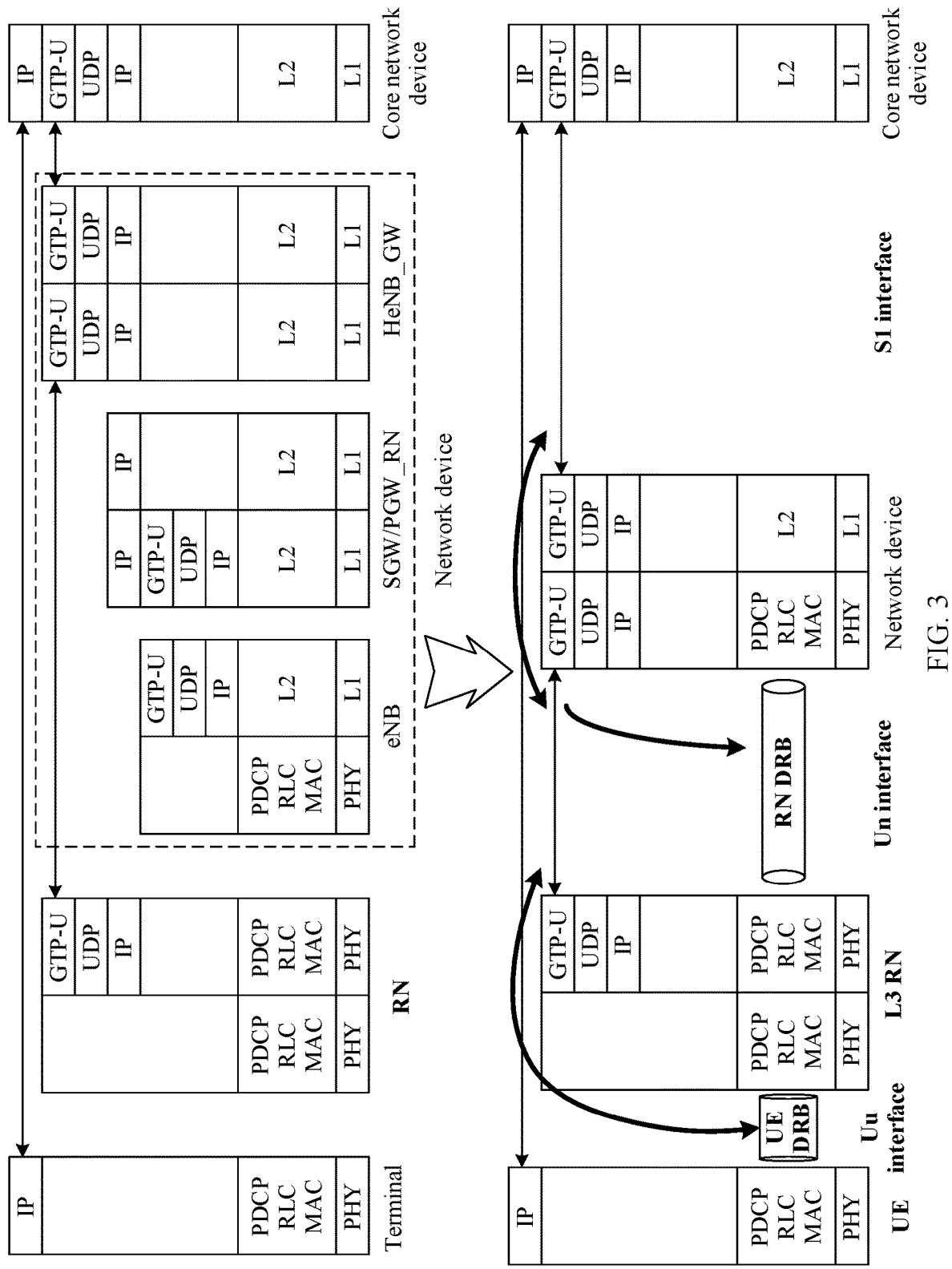
FIG. 3 is a schematic architectural diagram of a user plane protocol stack in the prior art.
Figure 4:
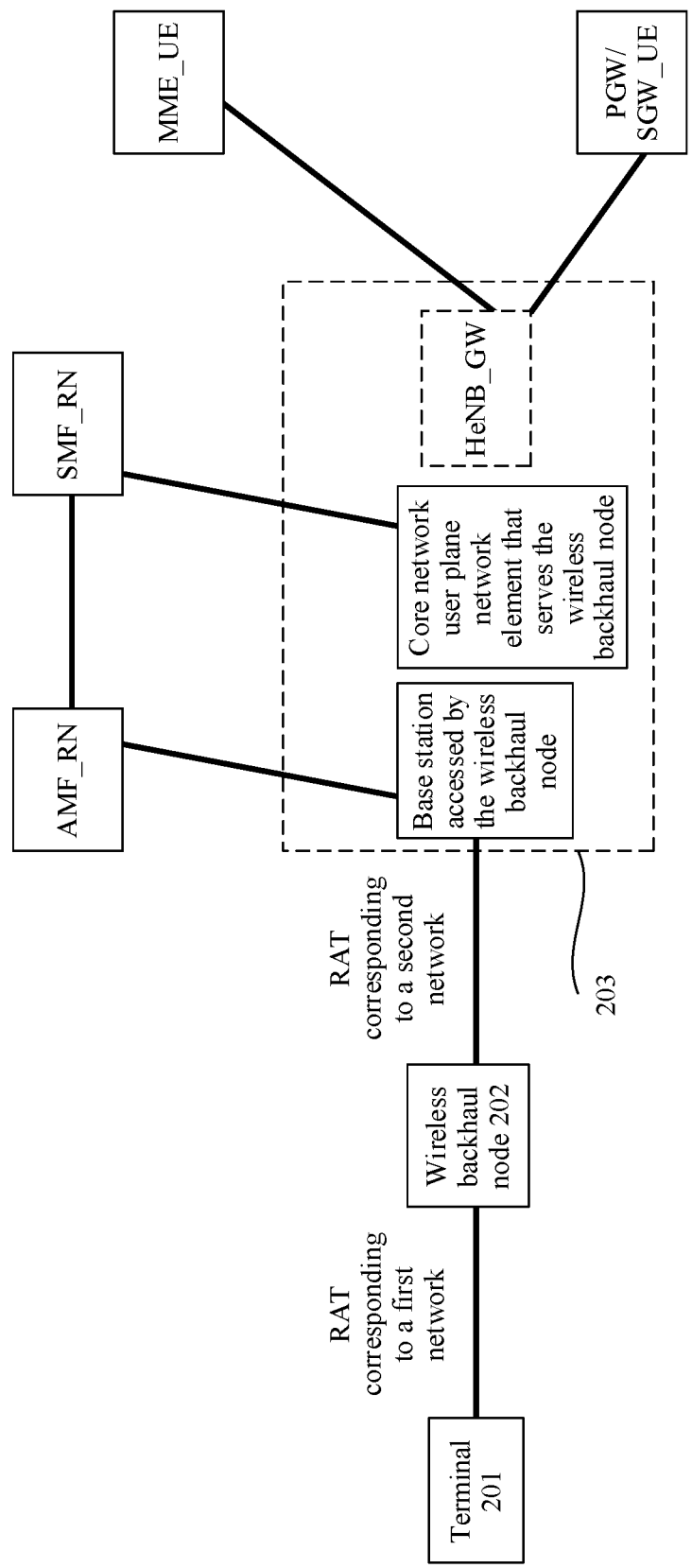
FIG. 4 is a schematic structural diagram of a wireless backhaul system according to an embodiment of this application.

FIG. 4 is a schematic diagram of a wireless backhaul system. The wireless backhaul system includes one or more (including two) access network devices 203 (only one access network device is shown) connected to a core network, a wireless backhaul node 202 connected to the access network device 203, one or more terminals 201 (only one terminal is shown) that access the access network device 203 through the wireless backhaul node 202.

When a method provided in the embodiments of this application is applied to a 5G network or an NR system, a wireless backhaul node in the following may be a wireless backhaul node in the 5G network. For example, the wireless backhaul node in the 5G network may be referred to as an IAB node, or certainly may have another name. This is not specifically limited in the embodiments of this application.

However, it should be noted that the method provided in the embodiments of this application may further be applied to another network, for example, may be applied to an evolved packet system (EPS) network (namely, a 4th generation (4G) or an LTE network that is generally mentioned). When the method provided in the embodiments of this application is applied to the EPS network, a wireless backhaul node in the following may be a wireless backhaul node in the EPS network. For example, the wireless backhaul node in the EPS network may be referred to as a relay node (RN).

The wireless backhaul node 202 is connected to both the terminal 201 and the access network device 203 in a wireless manner, and a RAT used for communication between the wireless backhaul node 202 and the terminal is different from a RAT used for communication between the wireless backhaul node 202 and the access network device 203.

For example, the wireless backhaul node 202 may be one or more wireless backhaul devices, for example, a relay device, located between the terminal and the access network device.

In an example, the wireless backhaul node 202 communicates with the terminal 201 by using a RAT corresponding to a first network, and the wireless backhaul node 202 communicates with the access network device 203 by using a RAT corresponding to a second network.

In an example, the RAT corresponding to the first network is an LTE network, the RAT corresponding to the second network is an NR network, and the NR network includes a 5G network or a next generation network.

In another example, the RAT corresponding to the first network is an NR network, and the RAT corresponding to the second network is an LTE network. In FIG. 4, an example in which the RAT corresponding to the first network is the LTE network and the RAT corresponding to the second network is the NR network is used, and constitutes no limitation on this application.

The wireless backhaul node 202 is configured to backhaul data and/or signaling between the access network device 203 and the terminal 201. The access network device 203 is used by the wireless backhaul node 202 to access the second network, and is configured to backhaul data and/or signaling to the terminal 201. Usually, the access network device 203 may alternatively be used as a physical network element, for example, referred to as a donor access network device. In a new radio (NR) system (or referred to as a 5G system), the donor access network device 203 may be a DgNB (donor gNodeB). In an LTE system (or referred to as a 4G system), the donor access network device may be a DeNB (donor eNodeB). Certainly, the donor access network device may alternatively be referred to as a gNB or an eNB for short.

As shown in FIG. 4, the donor access network device may usually include the following logical network elements: a base station accessed by the wireless backhaul node and a core network user plane network element that serves the wireless backhaul node. A core network control plane network element that serves the wireless backhaul node may be built in the donor access network device, or may be independent of the donor access network device (in FIG. 4, an example in which the core network control plane network element that serves the wireless backhaul node is located outside the donor access network device is used). The base station accessed by the wireless backhaul node is connected to the core network control plane network element that serves the wireless backhaul node.

It may be understood that in FIG. 4, MME_UE represents an MME that serves UE, and PGW/S-GW_UE represents a PGW/an S-GW that serves the UE.

Optionally, the donor access network device may further include a home eNB gateway (home eNB gateway, HeNB_GW). If the HeNB_GW exists in the donor access network device, the HeNB_GW is separately connected to a core network control plane network element that serves the terminal, and is connected to a core network user plane network element that serves the terminal.

If no HeNB_GW exists in the donor access network device, a core network control plane network element that serves the terminal, and a core network user plane network element that serves the terminal are connected to the core network user plane network element that serves the wireless backhaul node.

It may be understood that, in this application, the RAT corresponding to the first network is different from the RAT corresponding to the second network. For example, the first network and the second network may be any two different networks of a 2G network, a 3G network, the LTE network (for example, the 4G network), the NR network (for example, the 5G network), and another future network. In the following embodiment, an example in which the first network and the second network are any two different networks of the 4G network and the NR network is merely used. For example, the first network is the LTE network, and the second network is the NR network.

In an example, when the RAT of the second network used between the wireless backhaul node and the access network device is the NR network, that is, an NR technology is used between the wireless backhaul node and the access network device, a core network that serves the wireless backhaul node is a next generation core network (NGC). The NGC includes the corresponding core network control plane network element of the wireless backhaul node and the core network user plane network element corresponding to the wireless backhaul node. The corresponding core network control plane network element of the wireless backhaul node includes an access and mobility management function (AMF) network element and a session management function (SMF) network element connected to the AMF network element. The core network user plane network element corresponding to the wireless backhaul node is a user plane function (UPF) network element, and a base station accessed by the wireless backhaul node is an NR base station, for example, a next generation NodeB (gNB). The gNB is connected to the AMF network element, the AMF network element is connected to the SMF network element, and the SMF network element is connected to the UPF network element.

When the RAT of the first network used between the wireless backhaul node and the terminal is the LTE network, that is, the LTE system is used between the wireless backhaul node and the terminal, in the LTE system, a core network that serves the terminal may be an evolved packet core (EPC) network, and the EPC includes functional network elements such as a PGW/serving gateway (S-GW) and a mobility management entity (MME) of the terminal. The MME is connected to the HeNB_GW, and the PGW/S-GW is connected to the HeNB_GW.

It should be noted that, names of the interfaces between the network elements are merely examples, and the interfaces may have other names in a specific implementation. This is not specifically limited in this embodiment of this application.

It should be noted that the access network device, the AMF network element, the SMF network element, the UPF network element, and the like are merely names, and the names do not constitute a limitation on the devices. In the 5G network and the another future network, network elements corresponding to the first access network device, the AMF network element, the SMF network element, and the UPF network element may have other names. This is not specifically limited in this embodiment of this application. Unified descriptions are provided herein, and details are not described below again.

In another example, when the RAT of the second network used between the wireless backhaul node 202 and the access network device 203 is the LTE network, that is, an LTE technology is used between the wireless backhaul node 202 and the access network device 203, the access network device accessed by the wireless backhaul node 202 is an LTE base station (for example, an eNB). In this case, the core network user plane network element corresponding to the wireless backhaul node is a PGW/an S-GW, the corresponding core network control plane network element of the wireless backhaul node is an MME network element, the corresponding core network control plane network element of the terminal may be an AMF network element and an SMF network element, and the core network user plane network element corresponding to the terminal may be a UPF network element.

In an actual communication process, when the wireless backhaul node 202 receives data sent by the terminal 201, or when the wireless backhaul node 202 sends data to the terminal 201, the wireless backhaul node 202 is usually used as an access device similar to a base station. When the wireless backhaul node 202 receives data sent by the donor access network device, or when the wireless backhaul node 202 sends data to the donor access network device, the wireless backhaul node 202 is usually used as a device similar to a terminal. When the wireless backhaul node 202 is used as a terminal, the wireless backhaul node 202 may access a wireless network in a manner similar to that used by the terminal.

For example, the access network device 203 may be a device that communicates with the terminal 201, and the access network device 203 may be a base station, a relay station, an access point, or the like. The access network device 203 may be a base transceiver station (BTS) in a global system for mobile communications (GSM) or a code division multiple access (CDMA) network, or may be an eNB or an eNodeB (evolutional NodeB) in LTE. The access network device 203 may alternatively be an access network device in a 5G communications system or new radio (NR), or an access network device, for example, a next-generation base station (gNB), in a future evolved network, or may be a wearable device, a vehicle-mounted device, or the like. The 5G communications system or new radio (NR) is a next generation communications system under research. In addition, the communications systems may be further applicable to a future-oriented communications technology, and are all applicable to the technical solutions provided in the embodiments of this application.

Figure 5:
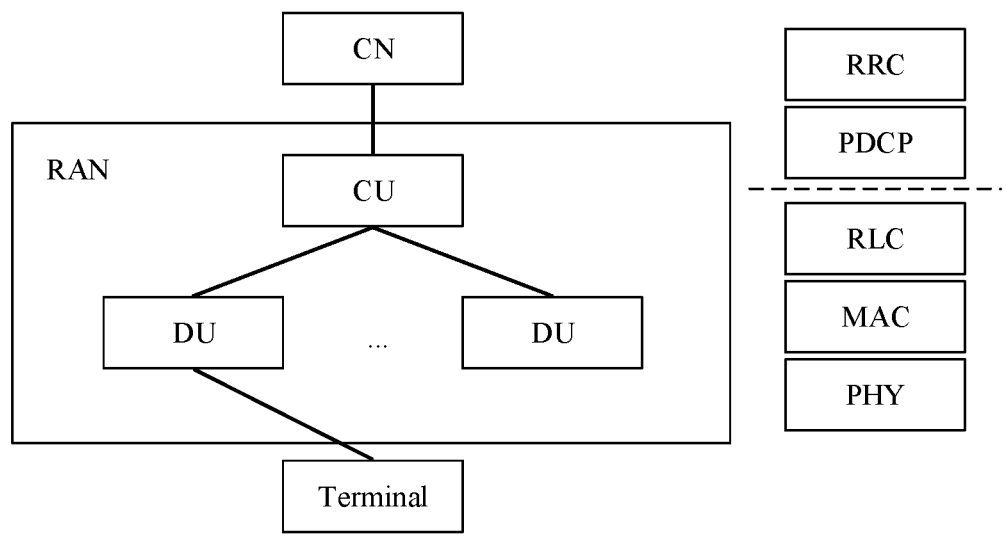
FIG. 5 is a schematic structural diagram of a base station according to an embodiment of this application.

A future access network may be implemented by using a cloud radio access network (C-RAN) architecture. In a possible manner, an architecture and a function of a protocol stack of a conventional base station are divided into two parts: One part is referred to as a central unit (CU), and the other part is referred to as a distributed unit (DU). Actual deployment manners of the CU and the DU are relatively flexible. For example, CUs of a plurality of base stations are integrated together to form a relatively large-scale functional network element. FIG. 5 is a schematic diagram of a network architecture according to an embodiment of this application. As shown in FIG. 5, the network architecture includes a CN device and a RAN device. The RAN device includes one or more CUs and one or more DUs. The access network device 203 may be the RAN device. The RAN device may be implemented by using one node, or may be implemented by using a plurality of nodes. The RAN device is configured to implement functions of protocol layers such as a radio resource control (RRC) layer, a packet data convergence protocol (PDCP) layer, a radio link control (RLC) layer, and a medium access control (MAC) layer. As shown in FIG. 5, the CU and the DU may be divided based on the protocol layers of a wireless network. For example, functions of the packet data convergence protocol layer and a protocol layer above the packet data convergence protocol layer are set on the CU, and functions of protocol layers, including functions of the RLC layer, the MAC layer, and the like, below the PDCP layer, are set on the DU. In FIG. 5, a CN represents a core network.

Division based on the protocol layer is merely an example, and division may alternatively be performed based on another protocol layer, for example, the RLC layer. Functions of the RLC layer and a layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, the division may alternatively be performed in another manner, for example, the division is performed based on a latency. A function whose processing time needs to meet a latency requirement is set on the DU, and a function whose processing time does not need to meet the latency requirement is set on the CU.

Figure 6:
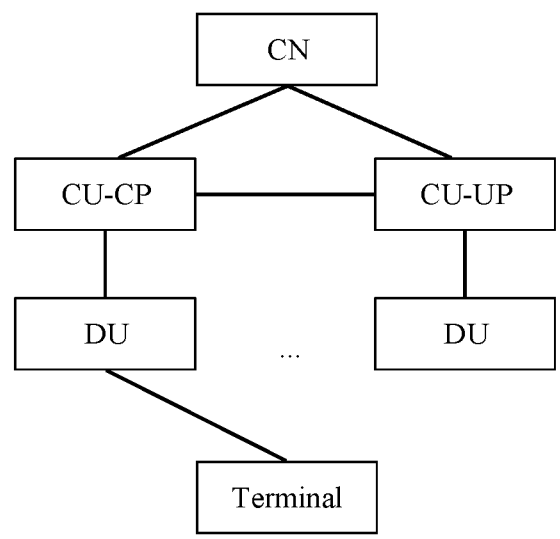
FIG. 6 is a schematic structural diagram of another base station according to another embodiment of this application.

In addition, still referring to FIG. 5, compared with an architecture shown in FIG. 6, a control plane (CP) and a user plane (UP) of the CU may further be separated into different network elements for implementation, and the different network elements are respectively a CU-control plane network element (CU-CP network elements) and a CU-user plane network element (CU-UP network element).

In the foregoing network architecture, data generated by the CU may be sent to a terminal through the DU, or data generated by the terminal may be sent to the CU through the DU. The DU may directly encapsulate the data at a protocol layer and then transmit the encapsulated data to the terminal or the CU without parsing the data. For example, signaling at the RRC layer or the PDCP layer is finally processed as data at a physical layer (PHY) and sent to the terminal, or is converted from received data at a PHY layer. In this architecture, the signaling at the RRC layer or the PDCP layer may also be considered to be sent by the DU.

In the foregoing embodiment, the CU is used as an access network device in a RAN. In addition, the CU may alternatively be classified as an access network device in a CN. This is not limited herein.

An apparatus in the following embodiment of this application may be located in a terminal or an access network device based on a function implemented by the apparatus. When the foregoing CU-DU structure is used, the access network device may be a CU node, a DU node, or a RAN device including functions of a CU node and a DU node.

The terminal 201 may be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal may communicate with one or more core networks (for example, network slices) through a radio access network (RAN), or may communicate with another terminal, for example, communication in a device-to-device (D2D) or machine-to-machine (M2M) scenario. The terminal may be a station (STA) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, a wearable device, and a next generation communications system, for example, a terminal in a 5th generation (5G) communications network or a terminal in a future evolved public land mobile network (PLMN).

In an example, in the embodiments of the present invention, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement all or some functions without depending on smartphones, for example, smart watches or smart glasses, and devices that focus on only one type of application function and need to work with other devices such as smartphones, for example, various smart bands or smart jewelry for monitoring physical signs.

Figure 7:
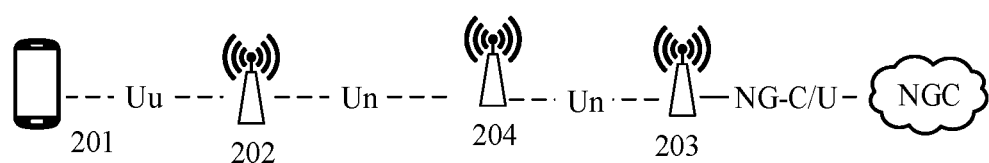
FIG. 7 is a schematic structural diagram of another wireless backhaul system according to another embodiment of this application.
Figure 8:
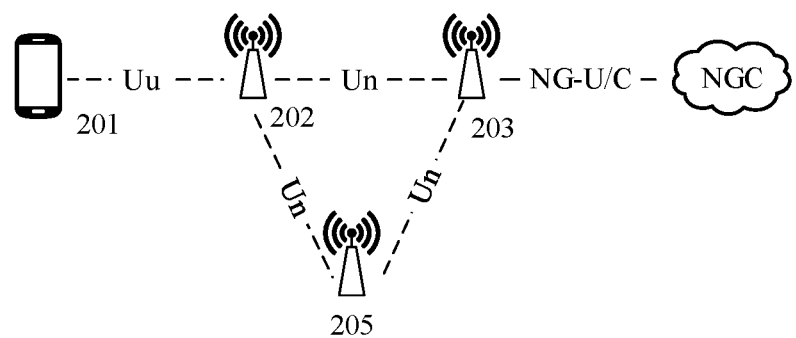
FIG. 8 is a schematic structural diagram of still another wireless backhaul system according to another embodiment of this application.

FIG. 7 and FIG. 8 each are a schematic diagram of another communications system according to this application. A difference between FIG. 7, FIG. 8, and FIG. 4 lies in that: In FIG. 7, the wireless backhaul node 202 and one or more (including two) wireless backhaul nodes 204 (only one wireless backhaul node 204 is shown in FIG. 7) constitutes a multi-hop communications system architecture. The wireless backhaul node 204 is connected to the access network device 203 in a wireless manner. FIG. 4 shows a single-hop IAB architecture. One or more (including two) wireless backhaul nodes 205 are further introduced into FIG. 8. In FIG. 8, the wireless backhaul node 202 communicates with the access network device 203 through two communications links. To be specific, the wireless backhaul node 202 is directly connected to the access network device 203, and is connected to the access network device 203 through the wireless backhaul node 205.

As shown in FIG. 7, when the terminal 201 and the wireless backhaul node 202 communicate with each other by using the RAT corresponding to the first network, an interface between the terminal 201 and the wireless backhaul node 202 is a first interface (for example, in an LTE network, the first interface is a Uu interface). When the wireless backhaul node 204 and the access network device 203 communicate with each other by using the RAT corresponding to the second network, an interface between the wireless backhaul node 204 and the access network device 203 is a second interface (for example, in an NR network, the second interface is a Un interface).

It may be understood that names and the like of the foregoing interfaces are merely names, and the name does not constitute a limitation on the interface. In a 5G network and another future network, the interface between the terminal 201 and the wireless backhaul node 202, and the interface between the wireless backhaul node 204 and the access network device 203 may have other names. This is not specifically limited in this embodiment of this application. Unified descriptions are provided herein, and details are not described below again.

It should be noted that each of FIG. 4, FIG. 7, and FIG. 8 is merely a schematic diagram of a communications system architecture used in this application. In an actual communication process, more or more complex communications system architectures may further be included.

Before the solutions provided in the embodiments of this application are described, protocol stack architectures in the embodiments are first described. As shown in FIG. 9 to FIG. 13, in the following embodiments, an LTE network is used between a terminal and a wireless backhaul node, an NR network is used for communication between the wireless backhaul node and an access network device, and a data transmission channel is set up for the terminal to transmit data of the terminal to an LTE core network.

Figure 9:
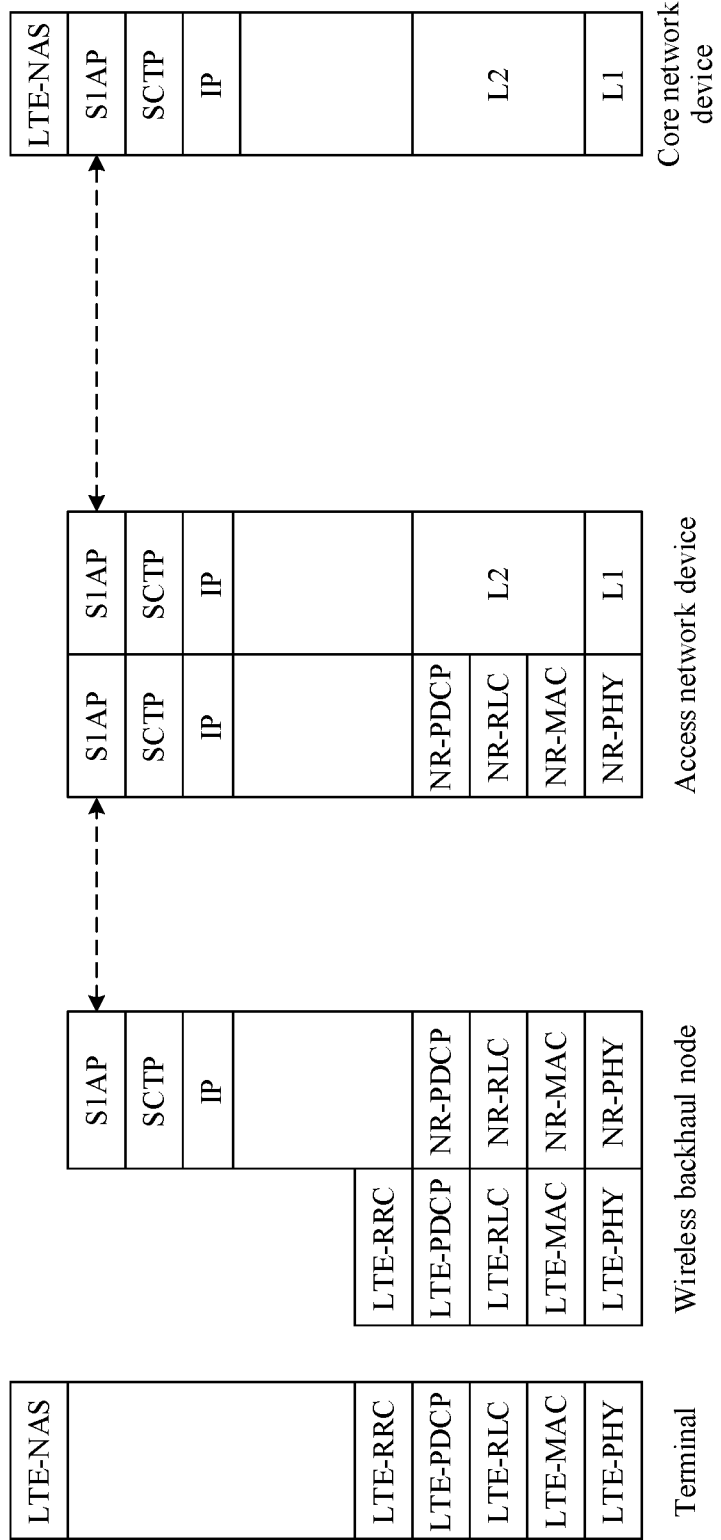
FIG. 9 is a schematic diagram of a control plane protocol stack according to another embodiment of this application.

For example, FIG. 9 shows a control plane protocol stack of an L3 architecture in this application. For a terminal, a control plane protocol stack of the terminal is a control plane protocol stack that is run in an LTE system. The control plane protocol stack includes a non-access stratum (NAS) layer, a radio resource control (RRC) layer, a packet data convergence protocol (PDCP) layer, a radio link control (RLC) layer, a medium access control (MAC) layer, and a physical layer (PHY) layer from top to bottom in sequence. For the wireless backhaul node 202, the wireless backhaul node 202 includes a first protocol stack corresponding to the terminal and a second protocol stack corresponding to an access network device. When the control plane protocol stack of the terminal is the control plane protocol stack in the LTE system, the first protocol stack may also be a protocol stack in the LTE system. When a control plane protocol stack corresponding to the access network device is a control plane protocol stack in an NR system, the second protocol stack is a protocol stack in the NR system.

For example, the first protocol stack includes an RRC layer, a PDCP layer, an RLC layer, a MAC layer, and a PHY layer from top to bottom in sequence, and the second protocol stack includes an S1 application protocol (AP) layer, a stream control transmission protocol (SCTP) layer, an IP layer, a PDCP layer, an RLC layer, a MAC layer, and a PHY layer from top to bottom in sequence. The control plane protocol stack of the access network device includes a third protocol stack corresponding to the second protocol stack and a fourth protocol stack corresponding to a core network device. When the wireless backhaul node and the access network device communicate with each other through an NR network, the third protocol stack includes an S1AP layer, an SCTP layer, an IP layer, a PDCP layer, an RLC layer, a MAC layer, and a PHY layer from top to bottom in sequence. The fourth protocol stack includes an S1AP layer, an SCTP layer, an IP layer, an L2, and an L1 layer from top to bottom in sequence. A control plane protocol stack of core network device includes a NAS layer, an S1AP layer, an SCTP layer, an IP layer, an L2 layer, and an L1 layer from top to bottom in sequence. That is, an S1 connection of the terminal is directly set up between the wireless backhaul node and an MME that serves the terminal. The wireless backhaul node sends an S1AP message of the terminal to a gNB through an NR air interface, and the gNB further sends the S1AP message to the MME that serves the terminal.

Figure 10:
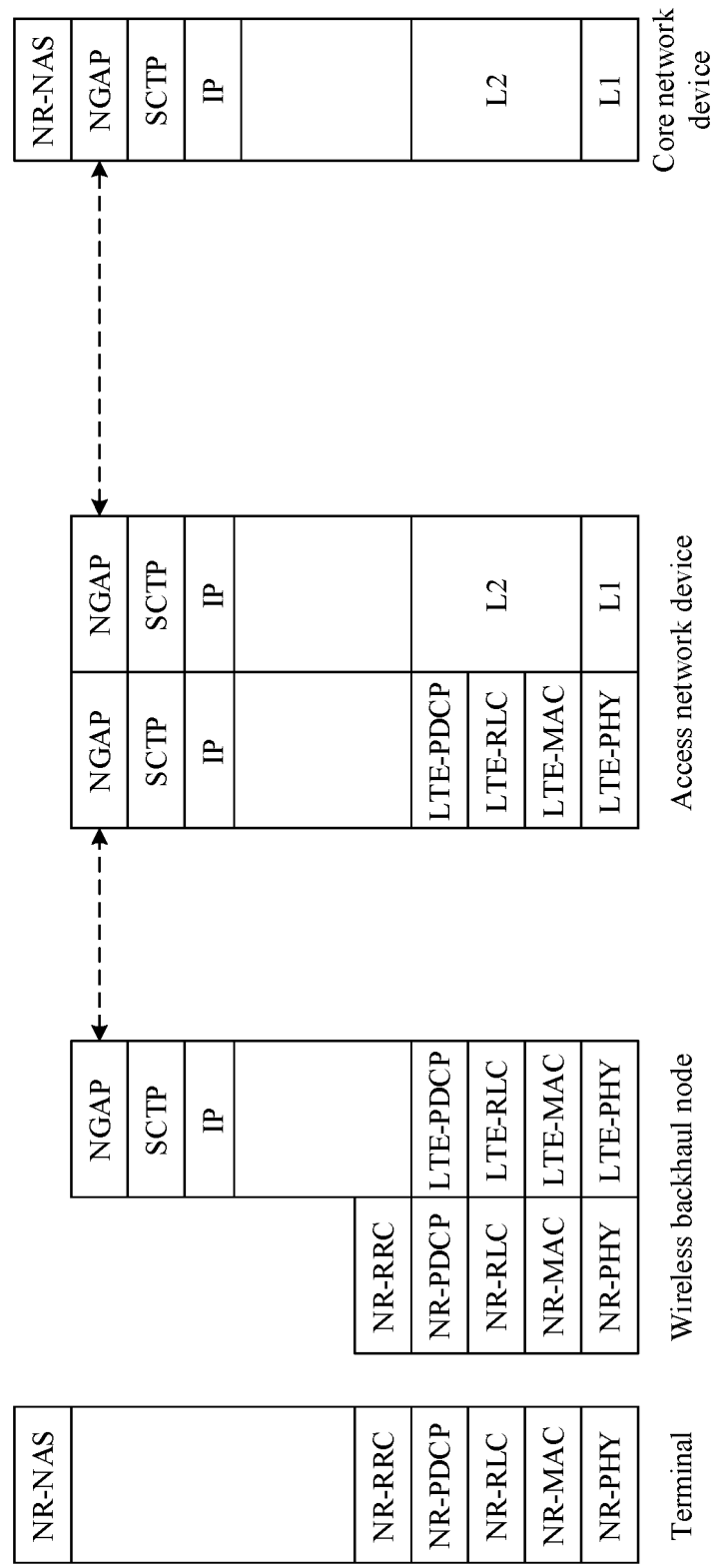
FIG. 10 is a schematic diagram of yet another control plane protocol stack according to another embodiment of this application.
Figure 11:
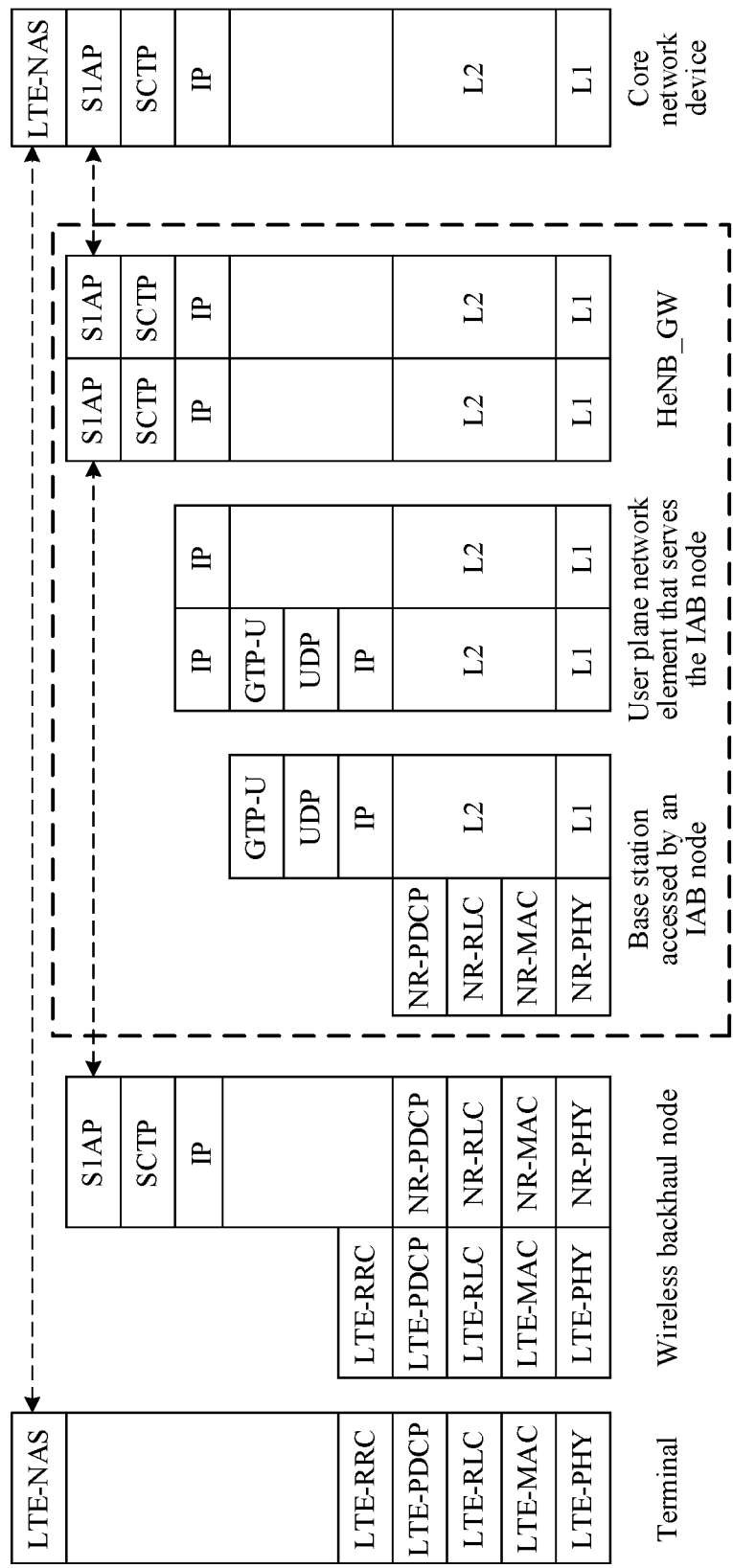
FIG. 11 is a schematic diagram of another control plane protocol stack according to another embodiment of this application.

It may be understood that in FIG. 9, an example in which a RAT corresponding to a first network is an LTE network, and a RAT corresponding to a second network is the NR network is merely used. In an actual process, when the RAT corresponding to the first network is the NR network, and the RAT corresponding to the second network is the LTE network, if a core network accessed by the terminal is an NR core network, the control plane protocol stack of the terminal is a control plane protocol stack that is run in the NR system, the first protocol stack included in the wireless backhaul node 202 is a protocol stack in the NR system, the second protocol stack is a protocol stack in the LTE system, and the third protocol stack of the access network device is a protocol stack in the NR system. As shown in FIG. 10, for example, the control plane protocol stack of the terminal includes, from top to bottom in sequence, a NAS layer, an RRC layer, a PDCP layer, an RLC layer, a MAC layer, and a PHY layer that are run in the NR system, the first protocol stack includes an RRC layer, a PDCP layer, an RLC layer, a MAC layer, and a PHY layer from top to bottom in sequence, and the second protocol stack includes an NGAP layer, an SCTP layer, an IP layer, a PDCP layer, an RLC layer, a MAC layer, and a PHY layer from top to bottom in sequence. That is, an NG connection of the terminal is directly set up between the wireless backhaul node and an AMF that serves the terminal. The wireless backhaul node sends an NGAP message of the terminal to an eNB through an LTE air interface, and the eNB further sends the NGAP message to the AMF that serves the terminal.

It should be noted that, if the RAT corresponding to the first network used between the terminal and the wireless backhaul node is the LTE network, and the RAT corresponding to the second network used between the wireless backhaul node and the gNB is the NR network, the wireless backhaul node generates an S1AP message, and the S1AP message is sent to the MME corresponding to the terminal through the NR network. If the RAT corresponding to the first network used between the terminal and the wireless backhaul node is the NR network, and a RAT corresponding to a network used between the wireless backhaul node and the eNB is the LTE network, the wireless backhaul node generates an NGAP message, and the NGAP message is sent to a corresponding AMF network element of the terminal in the NR network through the LTE network.

Based on the foregoing figure, the access network device may further be divided into a plurality of logical network elements. Therefore, the control plane protocol stack shown in FIG. 9 may alternatively use a protocol stack shown in FIG. 11. A difference between FIG. 11 and FIG. 9 lies in that transmission between the logical network elements in the access network device is further refined. Control plane protocol stacks respectively corresponding to the terminal and the wireless backhaul node are the same. In FIG. 9, the control plane protocol stack of the access network device integrates protocol stacks of three logical network elements: a base station accessed by the wireless backhaul node, a core network user plane network element that serves the wireless backhaul node, and an HeNB_GW. The protocol stack corresponding to the base station accessed by the wireless backhaul node includes a fifth protocol stack and a sixth protocol stack that correspond to the second protocol stack of the wireless backhaul node. The fifth protocol stack is a protocol stack that is run in the NR system, and the fifth protocol stack includes a PDCP layer, an RLC layer, a MAC layer, and a PHY layer from top to bottom in sequence. The sixth protocol stack includes a GTP-U layer, a UDP layer, an IP layer, an L2 layer, and an L1 layer from top to bottom in sequence. The protocol stack corresponding to the core network user plane network element that serves the wireless backhaul node includes a seventh protocol stack and an eighth protocol stack. The seventh protocol stack includes an IP layer, a GTP-user plane (UP) layer, a user datagram protocol (UDP) layer, an IP layer, an L2 layer, and an L1 layer. The eighth protocol stack includes an IP layer, an L2 layer, and an L1 layer. The protocol stack corresponding to the HeNB_GW includes two ninth protocol stacks, and the ninth protocol stack includes an S1AP layer, an SCTP layer, an IP layer, an L2 layer, and an L1 layer. That is, in the access network device, signaling of the terminal is transferred, through a user plane of the wireless backhaul node, to a core network device that serves the terminal.

For example, an S1 connection is set up between the wireless backhaul node and the access network device, and signaling or data on a S1 connection bearer is sent to the access network device through an NR air interface. User plane bearer mapping of the terminal on the interfaces that are completed through interaction between the control plane protocol stacks by the network elements shown in FIG. 9 and FIG. 11 includes mapping between a DRB that is of the terminal and that is between the terminal and the wireless backhaul node and a UE GTP tunnel that is between the wireless backhaul node and the access network device, and mapping between a GTP tunnel of the terminal that is between the wireless backhaul node and the access network device and a GTP tunnel that is between the access network device and a core network user plane network element corresponding to the terminal.

Figure 12:
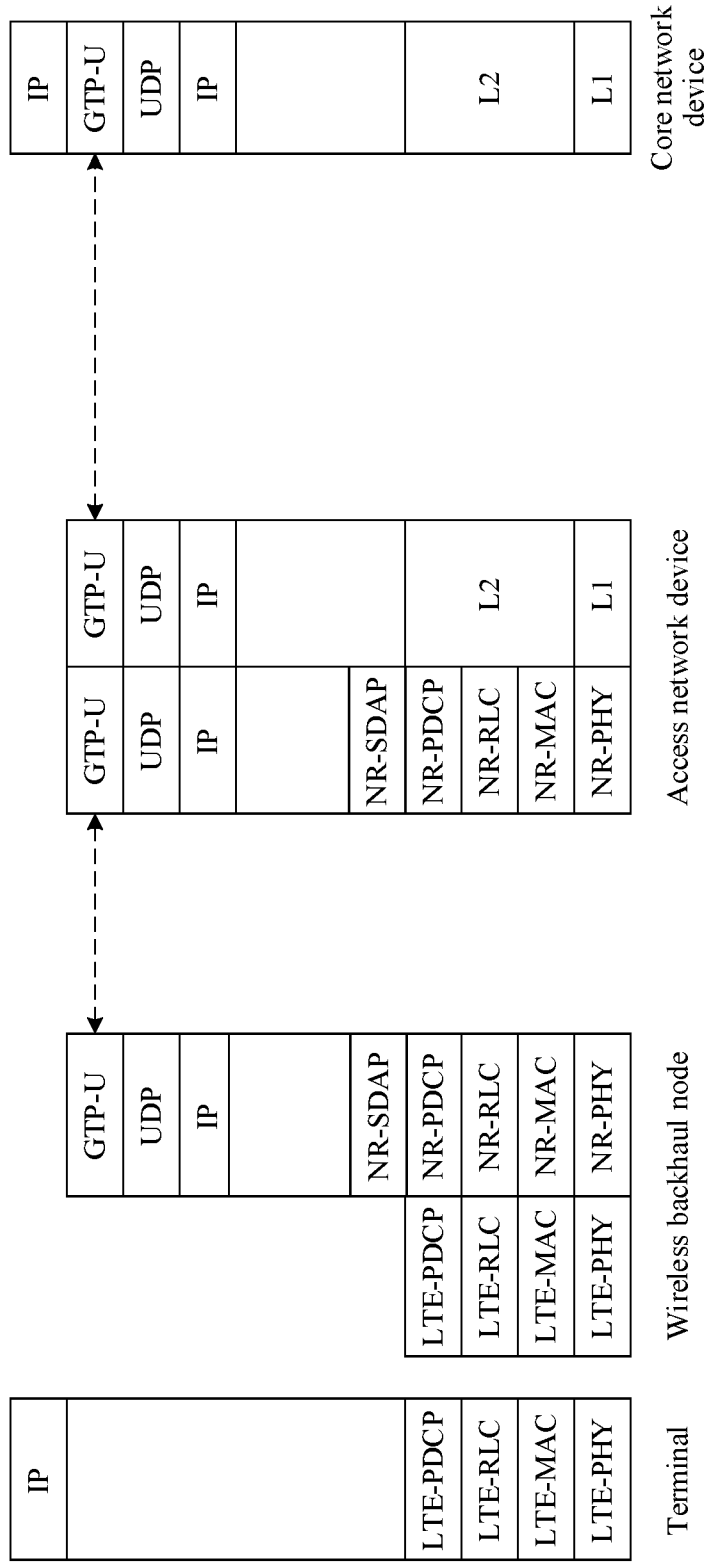
FIG. 12 is a schematic diagram of a user plane protocol stack according to another embodiment of this application.
Figure 13:
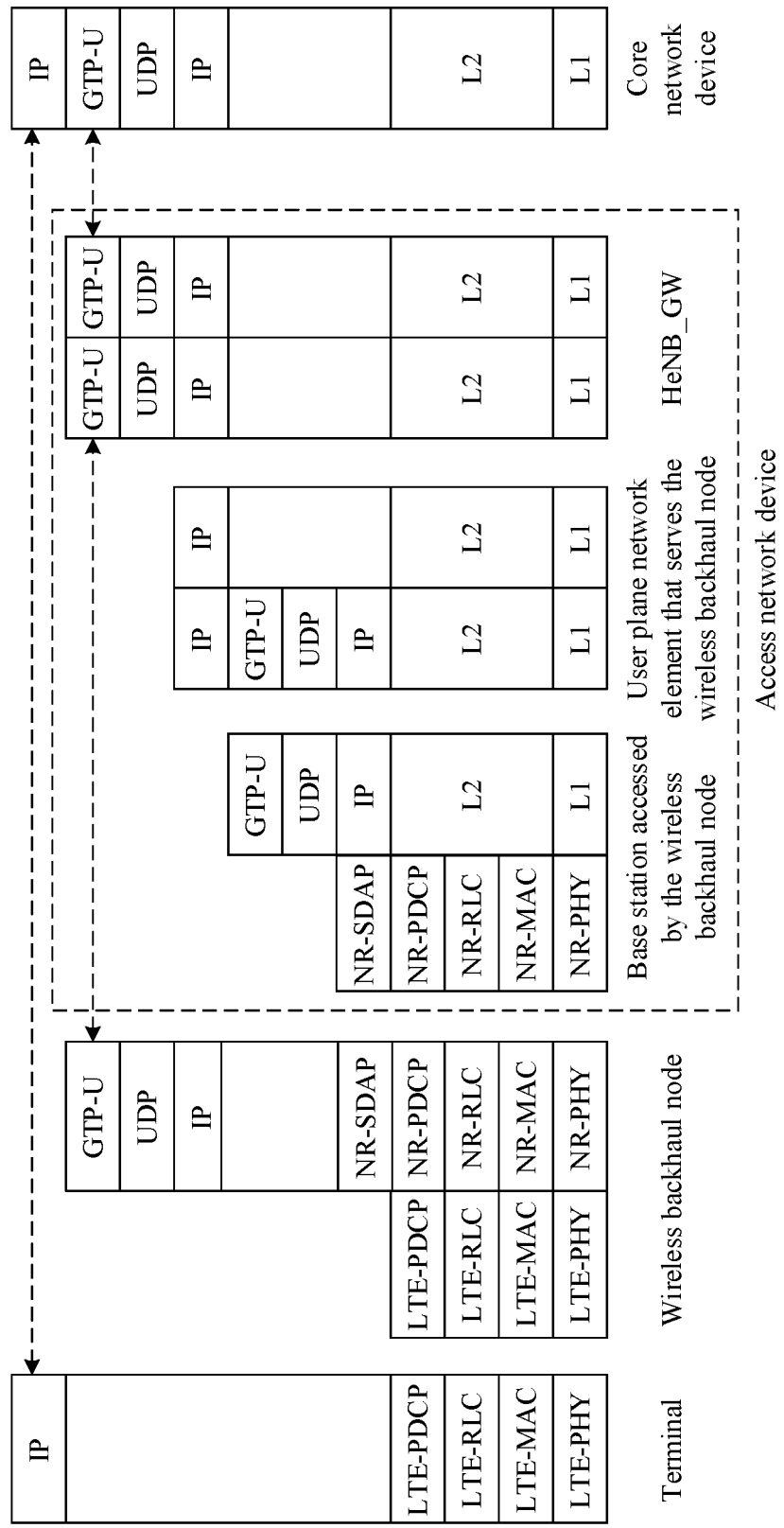
FIG. 13 is a schematic diagram of another user plane protocol stack according to another embodiment of this application.

FIG. 12 shows a user plane protocol stack of an L3 architecture in the embodiments of this application. For a terminal, a user plane protocol stack of the terminal is a user plane protocol stack that is run in an LTE system. The user plane protocol stack of the terminal includes an IP layer, a PDCP layer, an RLC layer, a MAC layer, and a PHY layer from top to bottom in sequence. A user plane protocol stack of a wireless backhaul node includes a tenth protocol stack and an eleventh protocol stack that correspond to the user plane protocol stack of the terminal. The tenth protocol stack is a protocol stack that is run in the LTE system, and the tenth protocol stack includes a PDCP layer, an RLC layer, a MAC layer, and a PHY layer from top to bottom in sequence. The eleventh protocol stack is a user plane protocol stack that is run in an NR system, and the eleventh protocol stack includes a GTP-U layer, a UDP layer, an IP layer, an SDAP layer, a PDCP layer, an RLC layer, a MAC layer, and a PHY layer from top to bottom in sequence. A user plane protocol stack of an access network device includes a twelfth protocol stack and a thirteenth protocol stack that are equivalent to the eleventh protocol stack. The twelfth protocol stack includes a GTP-U layer, a UDP layer, an IP layer, a service data adaptation protocol (SDAP) layer, a PDCP layer, an RLC layer, a MAC layer, and a PHY layer from top to bottom in sequence. The thirteenth protocol stack includes a GTP-U layer, a UDP layer, an IP layer, an L2 layer, and an L1 layer from top to bottom in sequence. A user plane protocol stack of a core network device includes an IP layer, a GTP-U layer, a UDP layer, an IP layer, an L2 layer, and an L1 layer from top to bottom in sequence.

Based on the foregoing figure, the access network device may further be divided into a plurality of logical network elements. Therefore, the user plane protocol stack shown in FIG. 12 may alternatively use a user plane protocol stack shown in FIG. 13. A difference between FIG. 13 and FIG. 12 lies in that transmission between the logical network elements in the access network device is further refined. User plane protocol stacks respectively corresponding to the terminal and the wireless backhaul node are the same. In FIG. 12, the user plane protocol stack of the access network device integrates protocol stacks of three logical network elements: a base station accessed by the wireless backhaul node, a core network user plane network element that serves the wireless backhaul node, and an HeNB_GW. A protocol stack corresponding to the base station accessed by the wireless backhaul node includes a fourteenth protocol stack and a fifteenth protocol stack that are run in the NR system. The fourteenth protocol stack includes an SDAP layer, a PDCP layer, an RLC layer, a MAC layer, and a PHY layer from top to bottom in sequence. The fifteenth protocol stack includes a GTP-U layer, a UDP layer, an IP layer, an L2, and an L1 layer from top to bottom in sequence. A protocol stack corresponding to the core network user plane network element that serves the wireless backhaul node includes a sixteenth protocol stack and a seventeenth protocol stack. The sixteenth protocol stack includes an IP layer, a GTP-U layer, a UDP layer, an IP layer, an L2 layer, and an L1 layer from top to bottom in sequence. The seventeenth protocol stack includes an IP layer, an L2 layer, and an L1 layer from top to bottom in sequence. A protocol stack corresponding to the HeNB_GW includes two eighteenth protocol stacks, and the eighteenth protocol stack includes a GTP-U layer, a UDP layer, an IP layer, an L2 layer, and an L1 layer from top to bottom in sequence.

It should be noted that, when a RAT used by a first network is an NR network, and a RAT used by a second network is an LTE network, the user plane protocol stack corresponding to the terminal is a user plane protocol stack that is run in the NR system, the tenth protocol stack included in the wireless backhaul node is a user plane protocol stack that is run in the NR system, the eleventh protocol stack included in the wireless backhaul node is a user plane protocol stack that is run in the LTE system, the twelfth protocol stack included in the access network device is a user plane protocol stack that is run in the LTE system, and the user plane protocol stack of the core network device is a user plane protocol stack that is run in the NR system. As shown in the foregoing user plane protocol stacks, a GTP tunnel specific to an E-RAB of each terminal is set up between the wireless backhaul node and the access network device, and signaling or data on a GTP tunnel bearer of the terminal is sent to the access network device through an NR air interface.

It may be understood that a communication method provided in this application may be performed by a first management unit or a communications apparatus, for example, a chip, applied to a first management unit. Another communication method provided in this application may be performed by a first device or a wireless backhaul apparatus, for example, a chip, applied to a first device. In the following embodiment, an example in which the communication method is performed by the first management unit and the another communication method is performed by the first device is used.

Figure 14:
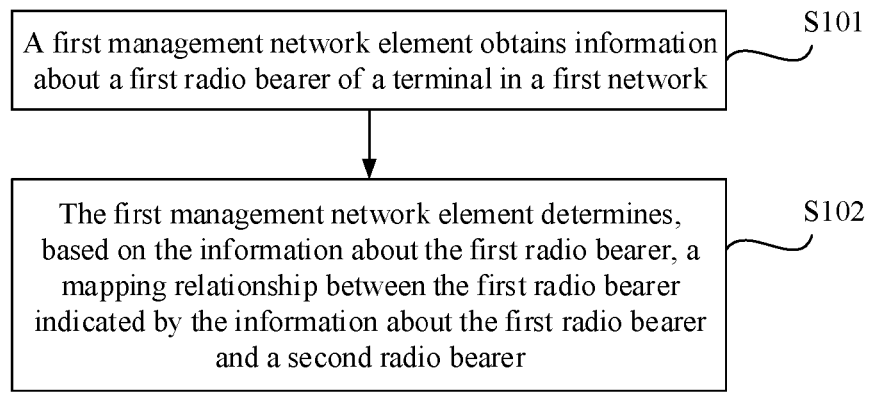
FIG. 14 is a schematic flowchart of a communication method according to another embodiment of this application.

FIG. 14 shows a procedure of a communication method according to this application. The method is applied to a wireless backhaul system. The wireless backhaul system includes a first network and a second network, the first network and the second network use different RATs, a terminal and an access network device in the wireless backhaul system communicate with each other through a first device, the first device communicates with the terminal by using a RAT corresponding to the first network, and the first device communicates with the access network device by using a RAT corresponding to the second network.

S101: A first management network element obtains information about a first radio bearer of the terminal in the first network, where the information about the first radio bearer is used to indicate the first radio bearer of the terminal in the first network, and the first management network element is configured to control session management of the first device in the second network.

Optionally, the access network device is used by the first device to access the second network.

The first management network element in this embodiment may be a core network control plane network element of the first device in the second network or a chip in a core network control plane network element of the first device in the second network. This is not limited in this application.

In an example, in this embodiment, the RAT used by the first network is an LTE network, and the RAT used by the second network is an NR network. In this case, the information about the first radio bearer may be information about an E-RAB bearer, and a QoS parameter corresponding to an identifier of the first radio bearer includes one or more of the following: a quality of service class identifier (QCI), an allocation and retention priority (ARP), a guaranteed bit rate (GBR), and a maximum bit rate (MBR). For example, the QoS parameter corresponding to the identifier of the first radio bearer includes the QCI and the GBR.

An identifier of a second radio bearer is a quality of service flow identifier QFI, and a QoS parameter corresponding to the QFI includes one or more of the following: a 5G QoS identifier (5QI), an allocation and retention priority (ARP), a guaranteed bit rate (GBR), and a maximum bit rate (MBR). For example, the QoS parameter corresponding to the QFI includes a QCI and the GBR.

A value of the QCI may be any value or range from 0 to 255. For example, for a GBR service, the value of the QCI ranges from 1 to 4. For a non-GBR service, the value of the QCI may range from 5 to 9. Different values corresponding to the QCI may correspond to different latencies, packet loss rates, and the like. The GBR is a guaranteed rate for data transmission.

For example, an identifier of one first radio bearer corresponds to one QCI and one GBR, to be specific, the identifier of the first radio bearer may be considered as one index, and once the QCI and the GBR are determined, QoS of a service corresponding to the QCI and the GBR is determined.

When the RAT corresponding to the first network is the LTE network, a core network control plane network element of the terminal in the first network may be a mobility management entity (MME). When the RAT corresponding to the second network is the NR network, the first management network element is an SMF network element or a chip applied to an SMF network element, that is, the corresponding core network control plane network element of the first device in the second network is the SMF network element.

In another possible implementation, in this application, the RAT corresponding to the second network is an LTE network, and the RAT corresponding to the first network is an NR network. Therefore, a QoS parameter corresponding to an identifier of the second radio bearer includes one or more of the following: a quality of service class identifier (QCI), an allocation and retention priority (ARP), a guaranteed bit rate (GBR), and a maximum bit rate (MBR). For example, the QoS parameter corresponding to the identifier of the second radio bearer includes the QCI and the GBR. An identifier of the first radio bearer is a quality of service flow identifier QFI, and a QoS parameter corresponding to the QFI includes one or more of the following: a 5G QoS identifier (5QI), an allocation and retention priority (ARP), a guaranteed bit rate (GBR), and a maximum bit rate (MBR). For example, the QoS parameter corresponding to the QFI includes a QCI and the GBR.

When the RAT used by the first network is the NR network, a corresponding core network control plane network element of the terminal in the first network may be an AMF network element. When the RAT corresponding to the second network is the LTE network, the first device accesses, through the LTE network, a core network S-GW/PGW corresponding to the first device in the LTE network, and is connected to a core network control plane (for example, the AMF network element and an SMF network element) of the terminal in the first network through the S-GW/PGW, or is connected to a core network user plane (for example, a UPF network element) of the terminal in the first network. In this way, the first management network element is an SMF network element of the terminal in the first network or a chip applied to an SMF network element.

Optionally, the information about the first radio bearer in this application may include the identifier of the first radio bearer and the quality of service (QoS) parameter corresponding to the identifier of the first radio bearer.

Optionally, the first radio bearer in this application may be a data radio bearer (DRB), or may be a signaling radio bearer (SRB).

S102: The first management network element determines a mapping relationship between the first radio bearer and the second radio bearer based on the information about the first radio bearer, where the second radio bearer is a radio bearer of the first device in the second network.

In an example, the mapping relationship between the first radio bearer and the second radio bearer of the first device in the second network may be a mapping relationship between the identifier of the first radio bearer and the identifier of the second radio bearer of the first device in the second network.

In this application, an identifier of one radio bearer may be a number of the radio bearer or an index of the radio bearer. This is not limited in this application. For an identifier of a radio bearer in the following descriptions, refer to the descriptions herein. Unified descriptions are provided herein, and details are not described below again.

It should be noted that, in this embodiment, a radio bearer may be indicated by an identifier of the radio bearer and a QoS parameter corresponding to the identifier of the radio bearer. For example, the first radio bearer may be indicated by the identifier of the first radio bearer and the QoS parameter corresponding to the identifier of the first radio bearer.

The terminal may have a plurality of first radio bearers in the first network. In the foregoing embodiment, an example in which the information about the first radio bearer includes an identifier of one first radio bearer and a QoS parameter corresponding to the identifier of the first radio bearer is merely used. When the terminal has a plurality of first radio bearers in the first network, the information about the first radio bearer may include the plurality of first radio bearers. Each first radio bearer corresponds to information about one first radio bearer, and the information about the first radio bearer includes an identifier of the first radio bearer and a QoS parameter corresponding to the identifier of the first radio bearer, as shown in Table 1. The first management network element may determine a mapping relationship between each first radio bearer and a second radio bearer of the first device in the second network, that is, one first radio bearer maps to one second radio bearer.

TABLE 1

Relationship between a radio bearer, an identifier of the radio bearer, and a corresponding QoS parameter

| Information about the first radio bearer | Identifier | QoS parameter |
| --- | --- | --- |
| First radio bearer 1 | Identifier 1 | QoS parameter 1 |
| First radio bearer 2 | Identifier 2 | QoS parameter 2 |

According to the communication method provided in this application, the first device obtains the information about the first radio bearer of the terminal in the first network, and sends the obtained information about the first radio bearer of the terminal in the first network to the first management network element, so that after receiving the information about the first radio bearer, the first management network element may determine the mapping relationship between the first radio bearer and the second radio bearer of the first device in the second network based on the QoS parameter included in the information about the first radio bearer. In this way, in a different-standard scenario, a service of the terminal can be mapped to the corresponding bearers in the first network and the second network for transmission, thereby improving service transmission quality.

Figure 15:
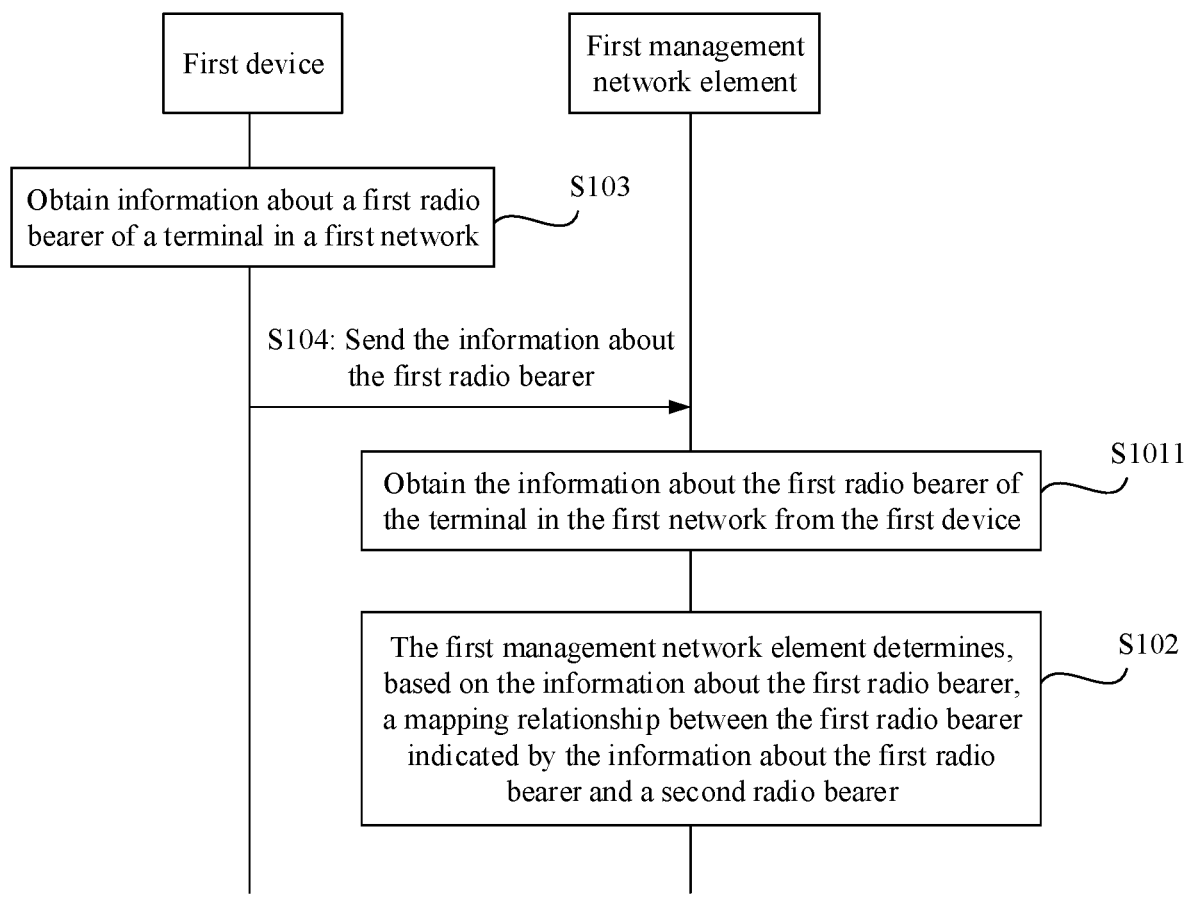
FIG. 15 is a schematic flowchart of a communication method according to another embodiment of this application.

In this application, the first management network element may obtain the information about the first radio bearer of the terminal in the first network in a plurality of manners. In an example, S101 in this application may be specifically implemented in the following manner: S1011: The first management network element may obtain the information about the first radio bearer of the terminal in the first network from the first device. In this case, in another embodiment of this application, before S1011, the method provided in this application further includes S103 and S104, as shown in FIG. 15.

S103: The first device obtains the information about the first radio bearer of the terminal in the first network, where the information about the first radio bearer is used to indicate the first radio bearer.

Optionally, the information about the first radio bearer may include the identifier of the first radio bearer and the quality of service (QoS) parameter corresponding to the identifier of the first radio bearer.

For example, the first device may be the wireless backhaul node shown in the foregoing figure, or may be a chip disposed in the wireless backhaul node.

For example, the first device may obtain, by using an S1AP message, the information about the first radio bearer that is set up by the terminal in the first network.

For example, the first device may obtain, in a process in which the terminal initially accesses the first network, the information about the first radio bearer that is set up by the terminal in the first network.

S104: The first device sends the information about the first radio bearer to the first management network element in the second network.

For example, in this application, the first device may first send the information about the first radio bearer to the access network device, so that the access network device sends the information about the first radio bearer to the first management network element, for example, the core network control plane network element, of the first device in the second network.

In an example, when the RAT corresponding to the second network is the NR network, core network control plane network elements corresponding to the first device in the second network are the AMF network element and the SMF network element. To be specific, the access network device sends the information about the first radio bearer to the AMF network element of the first device in the second network, and then the AMF network element sends the information about the first radio bearer to the SMF network element.

In another example, when the RAT corresponding to the second network is the NR network, core network control plane network elements of the first device in the second network are the AMF network element and the SMF network element, and the core network control plane network element of the terminal in the first network is the MME network element. In a process in which the terminal accesses the network, the MME network element that serves the terminal may obtain the information about the first radio bearer of the terminal in the first network. That is, the MME network element directly sends the obtained information about the first radio bearer to the SMF network element of the first device in the NR network. In this solution, a direct interface is required between the MME network element in the first network and the SMF network element in the second network.

In another example, S101 in this embodiment may be specifically implemented in the following manner: The first management network element obtains the information about the first radio bearer of the terminal in the first network from the core network control plane network element of the terminal in the first network. When the first management network element obtains information about one or more first radio bearers of the terminal in the first network from the core network control plane network element of the terminal in the first network, S103 and S104 may be omitted. However, an interface that can be used to exchange signaling may exist between the core network control plane network element of the terminal in the first network and the first management network element.

In another example, when the RAT corresponding to the first network is the NR network, and the RAT corresponding to the second network is the LTE network, core network control plane network elements of the terminal in the first network are the AMF network element and the SMF network element. The first device may send information about the second radio bearer of the first device in the second network to the SMF network element through the AMF network element, and the SMF network element determines the mapping relationship between the first radio bearer and the second radio bearer based on the information about the second radio bearer.

Figure 16:
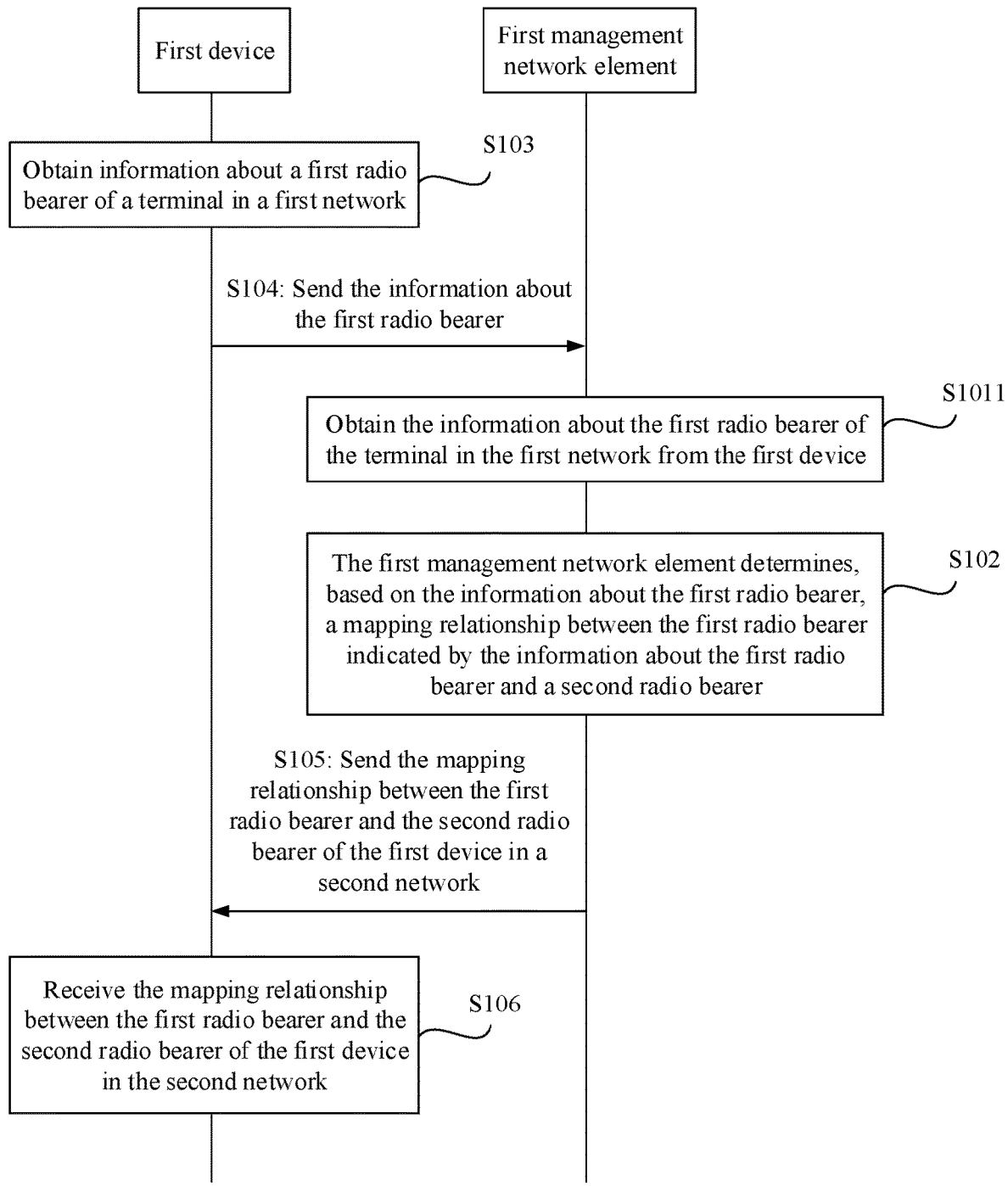
FIG. 16 is a schematic flowchart of a communication method according to another embodiment of this application.

In another embodiment of this application, after S102, the method provided in this application further includes S105 and S106, as shown in FIG. 16.

S105: The first management network element sends the mapping relationship between the first radio bearer and the second radio bearer of the first device in the second network.

Optionally, the first management network element may send the mapping relationship between the identifier of the first radio bearer and the identifier of the second radio bearer of the first device in the second network to the first device and/or the access network device.

Optionally, in this application, the first management network element may further send the mapping relationship between the identifier of the first radio bearer and the identifier of the second radio bearer of the first device in the second network to a core network user plane network element accessed by the first device, so that the core network user plane network element accessed by the first device can perform service bearer mapping based on the mapping relationship.

S106: The first device receives the mapping relationship that is between the first radio bearer and the second radio bearer of the first device in the second network and that is sent by the first management network element.

After the first device receives the mapping relationship between the first radio bearer and the second radio bearer of the first device in the second network, when the first device receives data of downlink transmission sent by the access network device, the first device may map, based on information about a bearer on which the downlink transmission is performed and the mapping relationship between the first radio bearer and the second radio bearer, the downlink transmission to a bearer that has a mapping relationship with the information about the bearer on which the downlink transmission is performed, to transmit the downlink transmission to the terminal. When the first device receives data of uplink transmission sent by the terminal, the first device may map, based on information about a bearer on which the data of uplink transmission is performed and the mapping relationship between the first radio bearer and the second radio bearer, the data of uplink transmission to a bearer that has a mapping relationship with the information about the bearer on which the data of uplink transmission is performed, to transmit the data of uplink transmission to the access network device for the access network device to send the data of uplink transmission to a core network device corresponding to the terminal.

Figure 17:
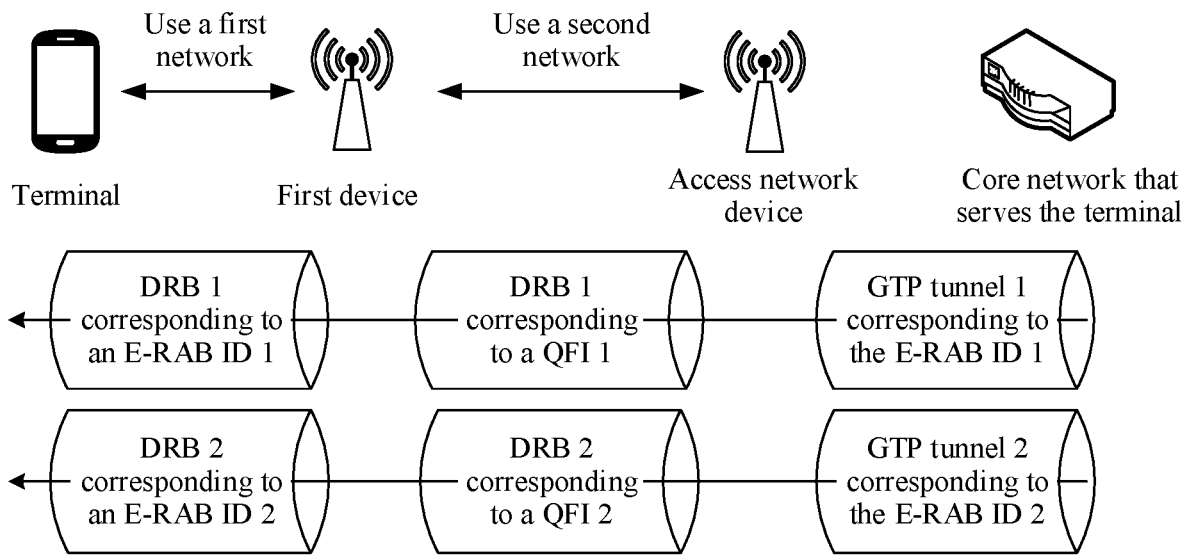
FIG. 17 is a schematic structural diagram of bearer mapping according to another embodiment of this application.

For example, downlink transmission is used as an example. As shown in FIG. 17, first radio bearers of the terminal in the first network are an E-RAB ID 1 and an E-RAB ID 2. The E-RAB ID 1 is mapped to a DRB 1 between the terminal and the first device, and the E-RAB ID 1 is mapped to a GTP tunnel 1 between the access network device and the MME that serves the terminal. The E-RAB ID 2 is mapped to a DRB 2 between the terminal and the first device, and the E-RAB ID 2 is mapped to a GTP tunnel 2 between the access network device and the MME that serves the terminal. Second radio bearers of the first device in the second network are a QFI 1 and a QFI 2. The QFI 1 is mapped to a DRB 1 between the first device and the access network device, and the QFI 2 is mapped to a DRB 2 between the first device and the access network device. If the SMF network element determines that the E-RAB ID 1 is mapped to the QFI 1, and the E-RAB ID 2 is mapped to the QFI 2, the access network device extracts a terminal service from the GTP tunnel 1, and maps the terminal service to the DRB 1 between the first device and the access network device, to send the terminal service to the first device, and the first device maps the data to the DRB 1 between the terminal and the first device, to send the data to the terminal; the access network device extracts a terminal service from the GTP tunnel 2, and maps the terminal service to the DRB 2 between the first device and the access network device, to send the terminal service to the first device, and the first device maps the data to the DRB 2 between the terminal and the first device, to send the data to the terminal.

Figure 18:
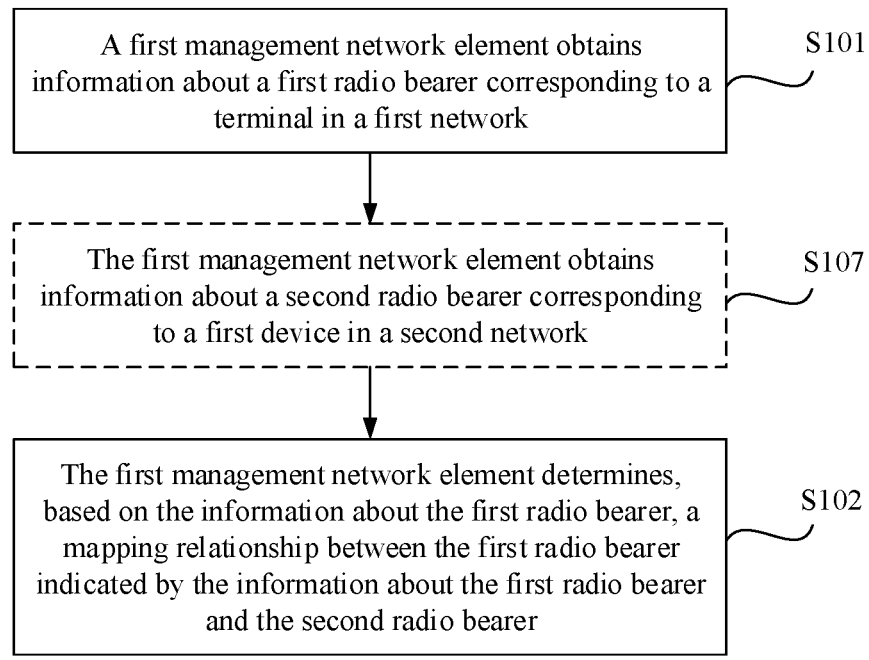
FIG. 18 is a schematic flowchart of a communication method according to another embodiment of this application.

Optionally, in still another embodiment of this application, before S102, the method provided in this embodiment is shown in FIG. 18.

S107: The first management network element obtains the information about the second radio bearer of the first device in the second network, where the information about the second radio bearer includes the identifier of the second radio bearer and the QoS parameter corresponding to the identifier of the second radio bearer.

Optionally, the information about the second radio bearer in this application is used to determine the second radio bearer of the first device in the second network.

It may be understood that the first device in this application has a plurality of second radio bearers in the second network, and each second radio bearer may be indicated by an identifier of one second radio bearer and a QoS parameter corresponding to the identifier of the second radio bearer.

In a possible implementation, S102 in this embodiment may be implemented in the following manner: The first management network element determines a first QoS parameter that is in the second network and that matches the QoS parameter corresponding to the identifier of the first radio bearer, and the first management network element determines a mapping relationship between the identifier of the first radio bearer and an identifier of a second radio bearer associated with the first QoS parameter.

It should be noted that the QoS parameter includes a QCI or a 5QI, and/or a guaranteed rate for service transmission and/or a maximum rate for service transmission, and different QCIs or 5QIs may correspond to different latencies, packet loss rates, and/or the like.

If latencies and/or packet loss rates and/or guaranteed rates for service transmission and/or maximum rates for service transmission that correspond to two radio bearers are the same or similar, QoS parameters corresponding to the two radio bearers match.

"Similar" means that a difference between two comparison objects is less than or equal to a threshold. For example, if a difference between latencies and/or packet loss rates and/or guaranteed rates for service transmission and/or maximum rates for service transmission that respectively correspond to two radio bearers is less than or equal to a threshold, QoS parameters corresponding to the two radio bearers match. The threshold is not limited in this embodiment.

For example, if latencies corresponding to two radio bearers are the same or similar, QoS parameters corresponding to the two radio bearers match. For another example, if packet loss rates corresponding to two radio bearers are the same or similar, QoS parameters corresponding to the two radio bearers match. For another example, if guaranteed rates for service transmission that correspond to two radio bearers are the same or similar, QoS parameters corresponding to the two radio bearers match. For another example, if maximum rates for service transmission that correspond to two radio bearers are the same or similar, QoS parameters corresponding to the two radio bearers match.

For example, when at least two of latencies, packet loss rates, guaranteed rates for service transmission, and maximum rates for service transmission that correspond to two radio bearers are respectively the same or similar, QoS parameters corresponding to the two radio bearers match.

For example, if latencies and packet loss rates that correspond to two radio bearers are respectively the same or similar, QoS parameters corresponding to the two radio bearers match. For another example, if latencies and guaranteed rates for service transmission that correspond to two radio bearers are respectively the same or similar, QoS parameters corresponding to the two radio bearers match. For another example, if latencies and maximum rates for service transmission that correspond to two radio bearers are respectively the same or similar, QoS parameters corresponding to the two radio bearers match. For another example, if packet loss rates and guaranteed rates for service transmission that correspond to two radio bearers are respectively the same or similar, QoS parameters corresponding to the two radio bearers match. For another example, if packet loss rates and maximum rates for service transmission that correspond to two radio bearers are respectively the same or similar, QoS parameters corresponding to the two radio bearers match. For another example, if guaranteed rates for service transmission and maximum rates for service transmission that correspond to two radio bearers are respectively the same or similar, QoS parameters corresponding to the two radio bearers match.

For another example, if latencies, packet loss rates, and guaranteed rates for service transmission that correspond to two radio bearers are respectively the same or similar, QoS parameters corresponding to the two radio bearers match. For another example, if latencies, packet loss rates, and maximum rates for service transmission that correspond to two radio bearers are respectively the same or similar, QoS parameters corresponding to the two radio bearers match. For another example, if packet loss rates, guaranteed rates for service transmission, and maximum rates for service transmission that correspond to two radio bearers are respectively the same or similar, QoS parameters corresponding to the two radio bearers match.

For another example, when latencies, packet loss rates, guaranteed rates for service transmission, and maximum rates for service transmission that correspond to two radio bearers are respectively the same or similar, QoS parameters corresponding to the two radio bearers match.

For example, the first QoS parameter that matches the QoS parameter corresponding to the identifier of the first radio bearer may be a first QoS parameter that is the same as the QoS parameter corresponding to the identifier of the first radio bearer, or may be a first QoS parameter that is similar to the QoS parameter corresponding to the identifier of the first radio bearer.

For example, if a latency corresponding to the QCI included in the QoS parameter corresponding to the identifier of the first radio bearer is A, and a latency corresponding to a QCI included in the first QoS parameter is also A or similar to A, the QoS parameter corresponding to the identifier of the first radio bearer matches the first QoS parameter.

For example, if the terminal has two or more radio bearers in the first network, for example, a radio bearer 1 corresponds to a QCI 1 and a GBR 1, and a radio bearer 2 corresponds to a QCI 2 and a GBR 2, and the first device has a service flow in the second network, and a QFI 1 corresponds to the QCI 1 and the GBR 1, the first management network element may determine that the QFI 1 of the first device in the second network and the radio bearer 1 of the terminal in the first device have same quality of service, so that a service on the radio bearer 1 is mapped to a bearer corresponding to the QFI 1 of the first device in the second network for transmission.

For example, if different latencies corresponding to two radio bearers belong to a same latency range, that is, a difference between the different latencies corresponding to the two radio bearers is less than or equal to a threshold, the first management network element may also consider that QoS parameters corresponding to the two radio bearers match.

For example, if packet loss rates corresponding to two radio bearers are different, and the packet loss rates corresponding to the two radio bearers belong to a same packet loss rate range, that is, a difference between the different packet loss rates corresponding to the two radio bearers is less than or equal to a threshold, the first management network element may also consider that QoS parameters corresponding to the two radio bearers match.

For another example, if guaranteed rates/maximum rates for service transmission that correspond to two radio bearers are different, and the guaranteed rates/maximum rates for service transmission that correspond to the two radio bearers belong to a same rate range, that is, a difference between the different guaranteed rates/maximum rates for service transmission that correspond to the two radio bearers is less than or equal to a threshold, the first management network element may also consider that QoS parameters corresponding to the two radio bearers match.

The first QoS parameter that matches the QoS parameter corresponding to the identifier of the first radio bearer may exist in the second network, or the first QoS parameter that matches the QoS parameter corresponding to the identifier of the first radio bearer may not exist. Therefore, in this application, the first management network element may determine, in the following manners, the first QoS parameter that is in the second network and that matches the QoS parameter corresponding to the identifier of the first radio bearer.

Manner 1: If a QoS parameter that matches the QoS parameter corresponding to the identifier of the first radio bearer exists in the second network, the first management network element determines the QoS parameter that matches the QoS parameter corresponding to the identifier of the first radio bearer as the first QoS parameter.

Manner 2: If no QoS parameter that matches the QoS parameter corresponding to the identifier of the first radio bearer exists in the second network, the first management network element triggers, based on the QoS parameter corresponding to the identifier of the first radio bearer, the first device to set up a target second radio bearer in the second network, where the target second radio bearer is indicated by an identifier of the target second radio bearer and a QoS parameter corresponding to the target second radio bearer; and the first management network element determines the QoS parameter corresponding to the target second radio bearer as the first QoS parameter.

Optionally, in this application, the first device has a first protocol stack and a second protocol stack, and the first protocol stack and the second protocol stack are used for different RATs; when the first device communicates with the terminal by using the RAT corresponding to the first network, the first device uses the first protocol stack; and when the first device communicates with the access network device by using the RAT corresponding to the second network, the first device uses the second protocol stack.

When the RATs corresponding to the first network and the second network are any two different RATs, the first protocol stack is a protocol stack of the first device when the first device communicates with the terminal in the first network, and the second protocol stack is a protocol stack used between the first device in the second network and the access network device accessed by the first device. An example in which the first network and the second network are any two different networks of the LTE network and the NR network is used below.

For example, when the RAT corresponding to the first network is the LTE network, the first protocol stack includes, from top to bottom in sequence, an RRC layer, a PDCP layer, an RLC layer, a MAC layer, and a PHY layer that are run in the LTE network; when the RAT corresponding to the second network is the NR network, the second protocol stack includes, from top to bottom in sequence, an S1AP layer, an SCTP layer, an IP layer, a PDCP layer, an RLC layer, a MAC layer, and a PHY layer, where the PDCP layer, the RLC layer, the MAC layer, and the PHY layer are run in the NR network.

For example, when the RAT corresponding to the first network is the NR network, the first protocol stack includes, from top to bottom in sequence, an RRC layer, a PDCP layer, an RLC layer, a MAC layer, and a PHY layer that are run in the NR network; when the RAT corresponding to the second network is the LTE network, the second protocol stack includes, from top to bottom in sequence, an NGAP layer, an SCTP layer, an IP layer, a PDCP layer, an RLC layer, a MAC layer, and a PHY layer, where the PDCP layer, the RLC layer, the MAC layer, and the PHY layer are run in the LTE network.

Figure 19:
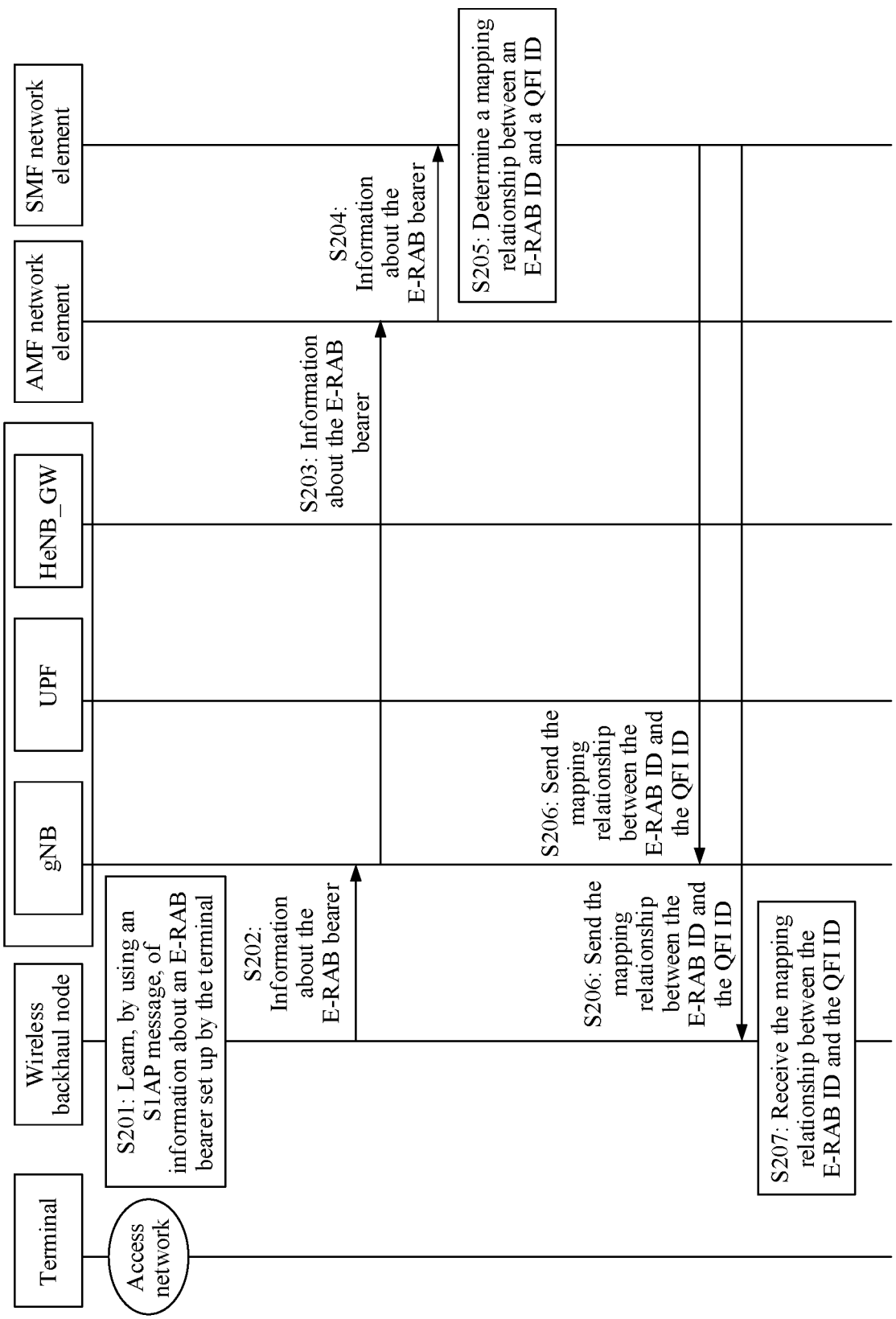
FIG. 19 shows a specific implementation procedure of a communication method according to another embodiment of this application.

As shown in FIG. 19, a communication method provided in this application is described below in detail by using an example in which the first device is an RN, the RAT corresponding to the first network is the LTE network, the RAT corresponding to the second network is the 5G NR network, and the first management network element is the SMF network element.

S201: In a process in which a terminal accesses a network through a wireless backhaul node, an IAB node learns, by using an S1AP message, of information about an E-RAB bearer that is set up by the terminal, where the information about the E-RAB bearer includes an E-RAB ID and a QoS parameter corresponding to the E-RAB ID.

For example, in a process in which the terminal accesses the first network through the wireless backhaul node, in the first network, an S-GW/a PGW that corresponds to the terminal sends a create session response message for a create session request to an MME corresponding to the terminal, where the create session response message includes the E-RAB ID, the QoS parameter corresponding to the E-RAB ID, and an S-GW GTP ID, and the S-GW GTP ID is used to identify a GTP tunnel between an access network device and the S-GW that serves the terminal. Then, the MME sends an initial context setup request message to an HeNB_GW, where the initial context setup request message carries the E-RAB ID, the QoS parameter corresponding to the E-RAB ID, and the S-GW GTP ID. After processing the initial context setup request message, the HeNB_GW sends the processed initial context setup request message to the wireless backhaul node. For example, in addition to the E-RAB ID and the QoS parameter corresponding to the E-RAB ID, the processed initial context setup request message further includes a GTP ID corresponding to the HeNB_GW, and the GTP ID corresponding to the HeNB_GW is used to identify a GTP tunnel between the access network device and the HeNB_GW that serves the terminal. In this way, the wireless backhaul node may determine the E-RAB ID and the QoS parameter corresponding to the E-RAB ID as the information about the E-RAB bearer.

S202: The wireless backhaul node sends the received information about the E-RAB bearer to a gNB.

For example, the wireless backhaul node may send the information about the E-RAB bearer to the gNB by using a NAS message.

S203: The gNB sends the information about the E-RAB bearer to an AMF network element corresponding to the wireless backhaul node.

For example, the gNB may send the information about the E-RAB bearer to the AMF network element by using a NAS message.

S204: The AMF network element sends the information about the E-RAB bearer to an SMF network element corresponding to the wireless backhaul node.

For example, the AMF network element may send the information about the E-RAB bearer by using a newly defined message between the AMF network element and the SMF network element, or may send the information about the E-RAB bearer by using an existing message between the AMF network element and the SMF network element (for example, an N11 interface message between the AMF network element and the SMF network element).

S205: The SMF network element determines a mapping relationship between the E-RAB ID and a QFI ID based on the information about the E-RAB bearer and information about a QFI bearer of the wireless backhaul node in the second network.

For example, the information about the QFI bearer includes the QFI ID and a QoS profile parameter associated with the QFI ID.

For example, the SMF network element determines, based on the QoS parameter corresponding to the E-RAB ID, a QoS profile parameter that is the same as the QoS parameter corresponding to the E-RAB ID, or a QoS profile parameter whose difference from the QoS parameter corresponding to the E-RAB ID is less than a threshold. The SMF network element sets up a mapping relationship between the E-RAB ID and a QFI ID associated with the QoS profile parameter.

S206: The SMF network element sends the mapping relationship between the E-RAB ID and the QFI ID to the wireless backhaul node and a DgNB.

For example, the SMF network element may send the mapping relationship between the E-RAB ID and the QFI ID to a UPF and a gNB in the DgNB.

For example, the SMF network element may send the mapping relationship between the E-RAB ID and the QFI ID to the UPF and the gNB in the DgNB in the following process.

The SMF network element first sends the mapping relationship between the E-RAB ID and the QFI ID to the AMF network element by using an N11 interface message, then the AMF network element sends the mapping relationship between the E-RAB ID and the QFI ID to the DgNB by using an N2 interface message (where an N2 interface is an interface between the AMF network element and the gNB network element). Both the UPF network element and the gNB are disposed in the DgNB. Therefore, after the DgNB obtains the mapping relationship that is between the E-RAB ID and the QFI ID and that is sent by the SMF network element, the UPF network element and the gNB in the DgNB learn of the mapping relationship between the E-RAB ID and the QFI ID.

S207: The wireless backhaul node receives the mapping relationship between the E-RAB ID and the QFI ID. In this way, after the wireless backhaul node has the mapping relationship between the E-RAB ID and the QFI ID, when receiving data of uplink transmission sent by the terminal, the wireless backhaul node may select, from the mapping relationship between the E-RAB ID and the QFI ID based on an E-RAB 1 on which the uplink transmission is performed and the mapping relationship that is between the E-RAB ID and the QFI ID and that is included in the wireless backhaul node, a QFI, for example, a QFI 1, that has a mapping relationship with the E-RAB 1, and transmit the data of uplink transmission to the access network device on the QFI 1. In addition, when receiving downlink transmission sent by the access network device, the wireless backhaul node may determine, based on the mapping relationship between the E-RAB ID and the QFI ID and the QFI 1 on which the downlink transmission is performed, the E-RAB 1 corresponding to the QFI 1, and transmit the downlink transmission to the terminal on the E-RAB 1.

Figure 20:
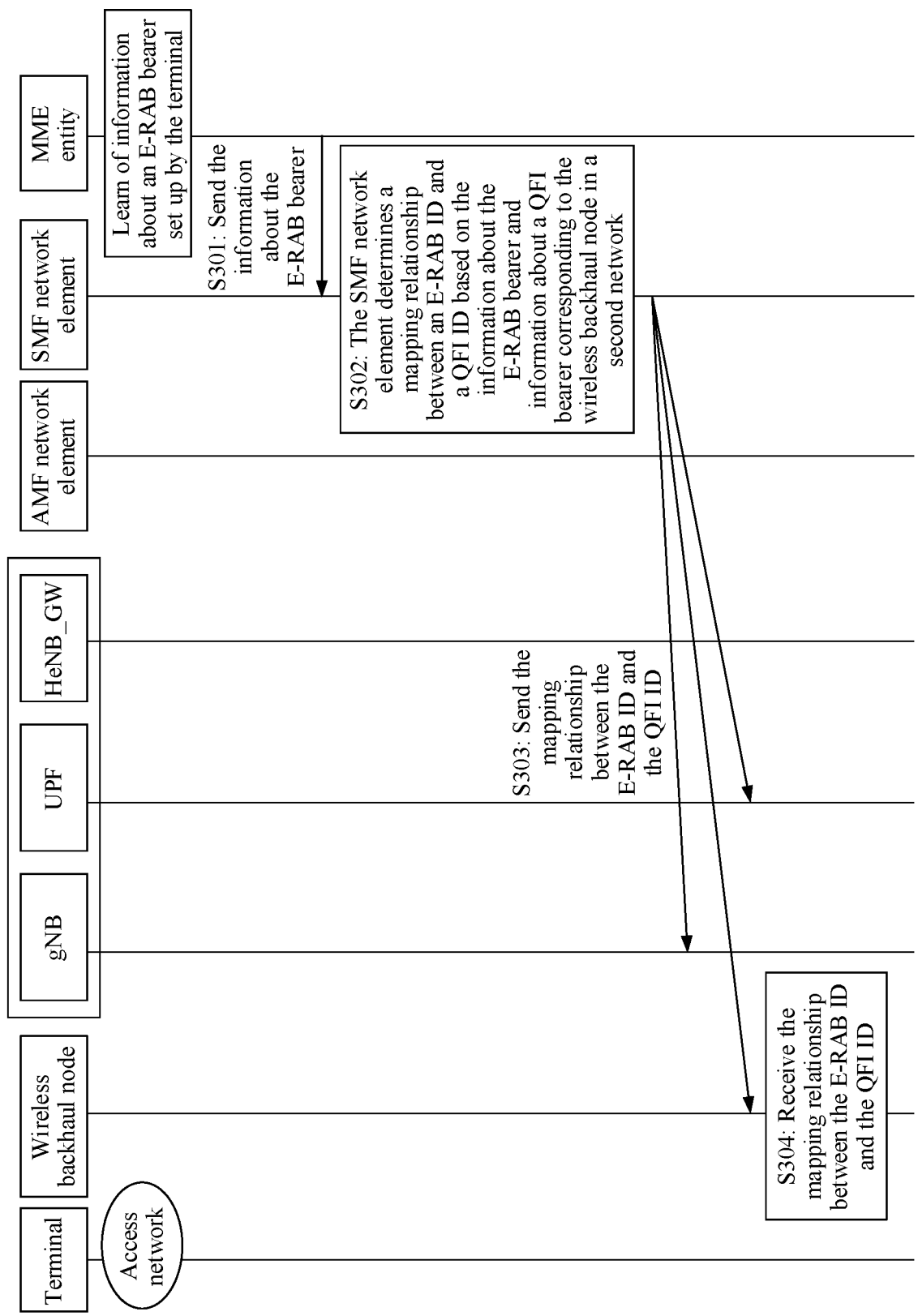
FIG. 20 shows a specific implementation procedure of a communication method according to another embodiment of this application.

As shown in FIG. 20, a difference between a method shown in FIG. 20 and the method shown in FIG. 19 lies in that S301 is used in FIG. 20 to replace S201 to S204 in FIG. 19. S302 in FIG. 20 is the same as S205 in FIG. 19, S303 in FIG. 20 is the same as S206 in FIG. 19, and S304 in FIG. 20 is the same as S207 in FIG. 20. For example, S301: when the terminal sets up the E-RAB bearer in the first network, the corresponding MME of the terminal in the first network sends information about the E-RAB bearer to an SMF network element corresponding to the RN in the second network, where the information about the E-RAB bearer includes the E-RAB ID and the QoS parameter corresponding to the E-RAB ID.

According to the communication method provided in this application, the first device obtains the information about the first radio bearer of the terminal in the first network, and sends the obtained information about the first radio bearer of the terminal in the first network to the first management network element, so that after receiving the information about the first radio bearer, the first management network element may obtain the mapping relationship between the identifier of the first radio bearer and the identifier of the second radio bearer of the first device in the second network based on the QoS parameter included in the information about the first radio bearer. The first management network element determines the mapping relationship, so that in a different-standard scenario, the access network device may map, based on the mapping relationship, a service of the terminal to the corresponding bearer in the second network, and transmit the service to the first device; or the first device maps, to the corresponding bearer in the second network, a service sent by the terminal, and transmits the service to the access network device, thereby improving service transmission quality.

The foregoing mainly describes, from a perspective of interaction between the network elements, the solutions provided in the embodiments of this application. It can be understood that, to implement the foregoing functions, the network elements, for example, the first management network element and the first device, include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first management network element and the first device may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in the embodiments of this application, module division is an example, and is merely logical function division. During actual implementation, another division manner may be used. An example in which each functional module is obtained through division based on each corresponding function is used below for description.

Figure 21:
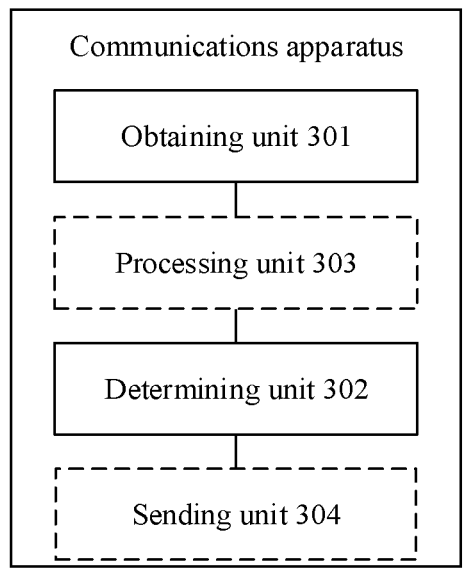
FIG. 21 is a schematic structural diagram of a communications apparatus according to another embodiment of this application.

When an integrated unit is used, FIG. 21 is a schematic structural diagram of the communications apparatus in the foregoing embodiments. The communications apparatus may be a first management network element or a chip applied to a first management network element. The communications apparatus includes an obtaining unit 301 and a determining unit 302. The obtaining unit 301 is configured to support the communications apparatus in performing S101, S1011, and S107 in the foregoing embodiments. The determining unit 302 is configured to support the communications apparatus in performing S102, S205, and S302 in the foregoing embodiments.

In addition, the communications apparatus may further include a processing unit 303 and a sending unit 304. The processing unit 303 is configured to support the communications apparatus in performing the step of triggering, based on the QoS parameter corresponding to the identifier of the first radio bearer, the first device to set up a target second radio bearer in the second network in the foregoing embodiment. The sending unit 304 is configured to support the communications apparatus in performing S105, S206, and S303 in the foregoing embodiments. All related content of the steps in the foregoing method embodiments may be cited in function descriptions of the corresponding functional modules, and details are not described herein again.

Figure 22:
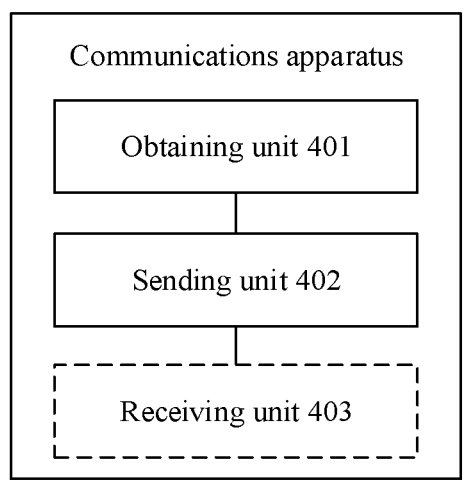
FIG. 22 is a schematic structural diagram of a wireless backhaul apparatus according to another embodiment of this application.

As shown in FIG. 22, when an integrated unit is used, FIG. 22 is a possible schematic structural diagram of the communications apparatus in the foregoing embodiments. The communications apparatus may be a first device or a chip applied to a first device. The communications apparatus includes an obtaining unit 401 and a sending unit 402. The obtaining unit 401 is configured to support the communications apparatus in performing S103 and S201 in the foregoing embodiments. The sending unit 402 is configured to support the communications apparatus in performing S104 and S202 in the foregoing embodiments. Optionally, the communications apparatus may further include a receiving unit 403, configured to support the communications apparatus in performing S106, S207, and S304 in the foregoing embodiments.

It should be understood that division into the units in the foregoing apparatuses is merely logical function division. In an actual implementation, all or some of the units may be integrated into a physical entity, or may be physically separate. In addition, all the units in the apparatuses may be implemented in a form of software invoked by a processing element, or may be implemented in a form of hardware; or some units may be implemented in a form of software invoked by a processing element, and some units may be implemented in a form of hardware. For example, in an implementation, each unit may be a separately disposed processing element, or may be integrated into a chip of the apparatus for implementation. Alternatively, each unit may be stored in a memory in a form of a program to be invoked by a processing element of the apparatus to perform a function of the unit. In addition, some or all of the units may be integrated together, or the units may be implemented independently. The processing element herein may be an integrated circuit and has a signal processing capability. In an implementation process, the steps in the foregoing methods or the foregoing units may be implemented by using an integrated logic circuit of hardware in the processor element, or may be implemented in a form of software invoked by the processing element.

For example, the unit in any one of the foregoing apparatuses may be configured as one or more integrated circuits, for example, one or more application-specific integrated circuits (ASIC), or one or more microprocessors (digital signal processor (DSP)), or one or more field programmable gate arrays (FPGA), for implementing the foregoing methods. For another example, when the unit in the apparatus is implemented by scheduling a program by a processing element, the processing element may be a general purpose processor, for example, a central processing unit (CPU) or another processor that can invoke the program. For another example, the units may be integrated and implemented in a form of a system-on-a-chip (SOC).

The receiving unit (or a unit used for receiving) is an interface circuit of the communications apparatus, and is configured to receive a signal from another apparatus, module, or unit. For example, when the communications apparatus is implemented in a form of a chip, the receiving unit or the obtaining unit is an interface circuit that is of the chip and that is configured to receive a signal from another chip or apparatus. The sending unit (or a unit used for sending) is an interface circuit of the communications apparatus, and is configured to send a signal to another apparatus. For example, when the communications apparatus is implemented in a form of a chip, the sending unit is an interface circuit that is of the chip and that is configured to send a signal to another chip or apparatus.

Figure 23:
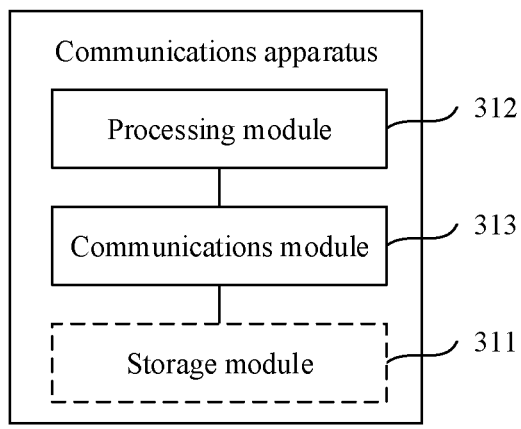
FIG. 23 is a schematic structural diagram of a communications apparatus according to another embodiment of this application.

When an integrated unit is used, FIG. 23 is a schematic diagram of a possible logical structure of the communications apparatus in the foregoing embodiments. The communications apparatus may be the first management network element in the foregoing embodiments or may be a chip applied to the first management network element. The communications apparatus includes a processing module 312 and a communications module 313. The processing module 312 is configured to control and manage an action of the communications apparatus. For example, the processing module 312 is configured to perform a step of processing a message or data on a side of the communications apparatus, for example, support the communications apparatus in performing S102, S205, and S302 in the foregoing embodiments. The communications module 313 is configured to support the communications apparatus in performing S101, S1011, S107, S105, S206, and S303 in the foregoing embodiments, and/or another process that is used for the technology described in this specification and that is performed by the communications apparatus.

Optionally, the communications apparatus may further include a storage module 311, configured to store program code and data that are of the communications apparatus.

The processing module 312 may be a processor or a controller, for example, may be a central processing unit, a general purpose processor, a digital signal processor, an application-specific integrated circuit, a field programmable gate array or another programmable logic device, a transistor logic device, a hardware component, or any combination thereof. The processing module 312 may implement or execute various example logical blocks, modules, and circuits described with reference to content disclosed in the present invention. Alternatively, the processing module 312 may be a combination of processors implementing a computing function, for example, a combination of one or more microprocessors or a combination of a digital signal processor and a microprocessor. The communications module 313 may be a transceiver, a transceiver circuit, a communications interface, or the like. The storage module 311 may be a memory.

Figure 24:
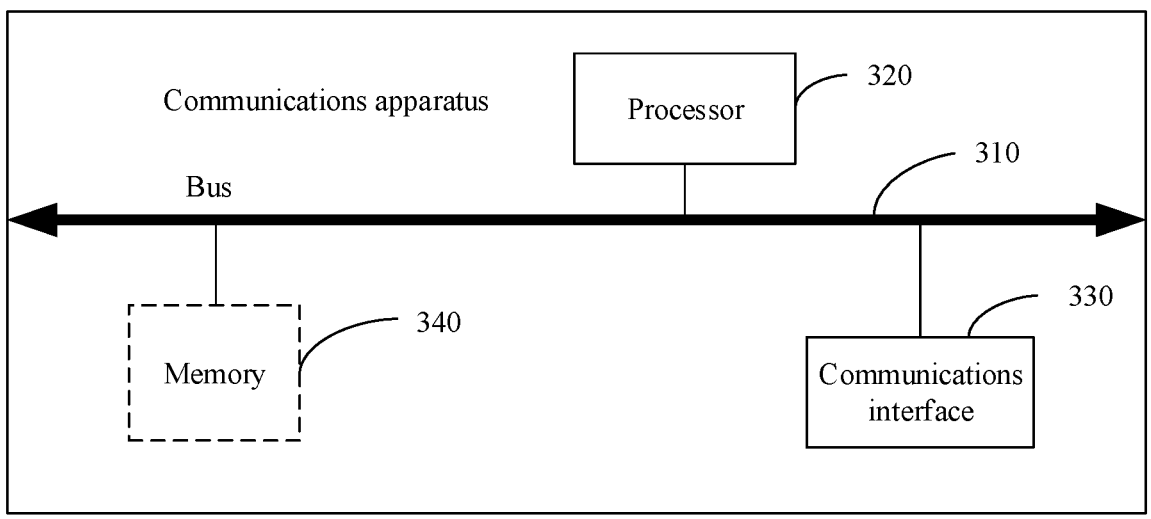
FIG. 24 is a schematic structural diagram of a communications apparatus according to another embodiment of this application.

When the processing module 312 is a processor 320, the communications module 313 is a communications interface 330 or a transceiver, and the storage module 311 is a memory 340, the communications apparatus in this application may be a device shown in FIG. 24.

The communications interface 330, one or more (including two) processors 320, and the memory 340 are connected to each other through a bus 310. The bus 310 may be a PCI bus, an EISA bus, or the like. The bus may be classified into an address bus, a data bus, a control bus, and the like. For ease of representation, only one thick line is used for representation in FIG. 24, but this does not mean that there is only one bus or only one type of bus. The memory 340 is configured to store the program code and the data that are of the communications apparatus. The communications interface 330 is configured to support the communications apparatus in communicating with another device (for example, a first device). The processor 320 is configured to support the communications apparatus in executing the program code and the data that are stored in the memory 340, to implement S102, S205, S302, S101, S1011, S107, S105, S206, and S303 provided in this application.

Figure 25:
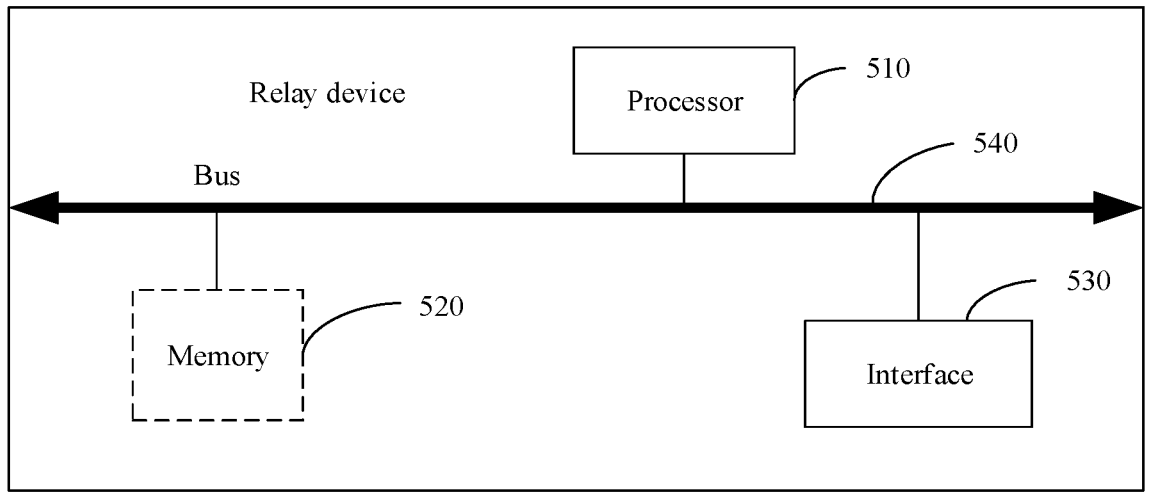
FIG. 25 is a schematic structural diagram of a relay device according to another embodiment of this application.

FIG. 25 is a schematic structural diagram of a relay device according to an embodiment of this application. The relay device may be the first device in the foregoing embodiments, and is configured to implement an operation of the first device in the foregoing embodiments.

As shown in FIG. 25, the relay device includes a processor 510, a memory 520, and an interface 530. The processor 510, the memory 520, and the interface 530 are connected through a bus 540. The bus may be implemented by using a connection circuit. The memory 520 is configured to store a program. When the program is invoked by the processor 510, the method performed by the first device in the foregoing embodiments may be implemented. The interface 530 is configured to communicate with another network device.

The foregoing method performed by the first device may be performed by a communications apparatus. The communications apparatus may be a relay device or a chip applied to a relay device, and functions of units (for example, the obtaining unit 401, the sending unit 402, and the receiving unit 403 described in the foregoing embodiment) of the communications apparatus may be implemented by the processor 510 by invoking the program stored in the memory 520. That is, the communications apparatus includes a memory and a processor. The memory is configured to store a program, and the program is invoked by the processor to perform the method performed by the first device in the foregoing method embodiments. The processor herein may be a general purpose processor, for example, a central processing unit (central processing unit, CPU), or may be another processor that can invoke the program. Alternatively, the processor may be configured as one or more integrated circuits, for example, one or more application-specific integrated circuits (ASIC), one or more microprocessors (DSP), or one or more field programmable gate arrays (FPGA), for implementing the method performed by the first device in the foregoing embodiments. A quantity of memories is not limited, and there may be one or more memories.

Figure 26:
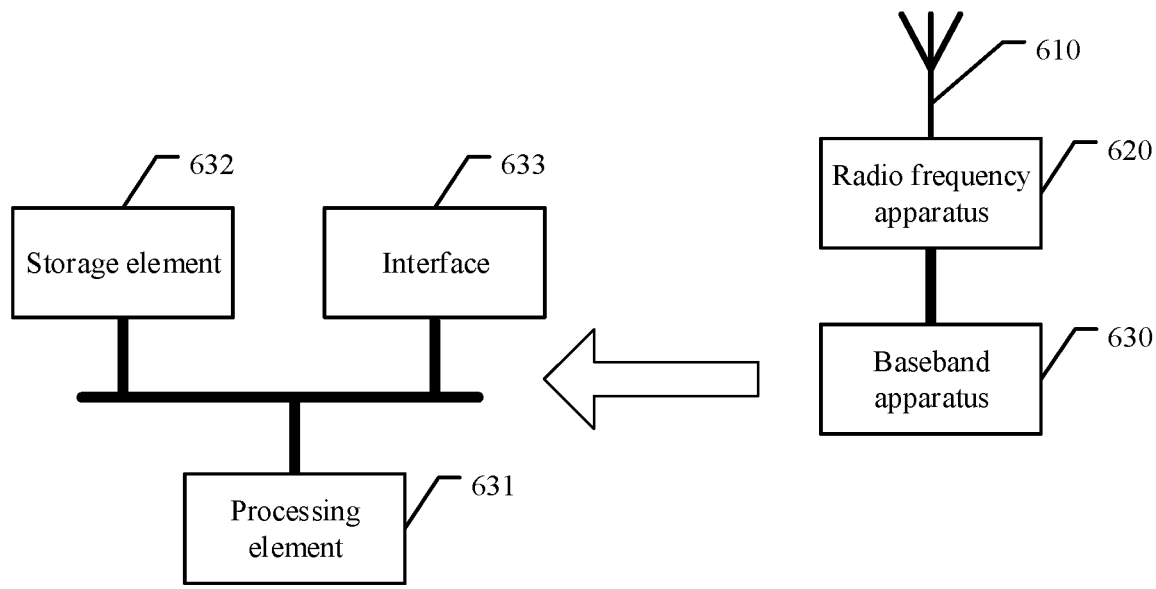
FIG. 26 is a schematic structural diagram of still another relay device according to another embodiment of this application.

FIG. 26 is a schematic structural diagram of another relay device according to an embodiment of this application. The relay device may be the first device in the foregoing embodiments, and is configured to implement an operation of the first device in the foregoing embodiments. As shown in FIG. 26, the relay device includes an antenna 610, a radio frequency apparatus 620, and a baseband apparatus 630. The antenna 610 is connected to the radio frequency apparatus 620. In an uplink direction, the radio frequency apparatus 620 receives, through the antenna 610, information sent by a terminal, and sends the information sent by the terminal, to the baseband apparatus 630 for processing. In a downlink direction, the baseband apparatus 630 processes the information sent by the terminal and sends the information to the radio frequency apparatus 620, and the radio frequency apparatus 620 processes the information sent by the terminal and then sends the information to the terminal through the antenna 610.

The baseband apparatus 630 may be a physical apparatus, or may include at least two apparatuses that are physically separate. The baseband apparatus 630 and the radio frequency apparatus 620 may be integrated together, or may be physically separate. The baseband apparatus 630 may include one or more (including two) baseband boards, and a plurality of processing elements may be integrated on the baseband board to implement a baseband processing function. The relay device is a RAN device, for example, an eNB in an LTE system. In this case, the baseband apparatus 630 may be a baseband apparatus in the eNB. For another example, the relay device may be a RAN device, and the baseband apparatus may be a DU node.

The foregoing method performed by the first device may be performed by a communications apparatus. The communications apparatus may be applied to the first device. The communications apparatus may be located in the baseband apparatus 630. In an implementation, the units shown in FIG. 22 are implemented by scheduling a program by a processing element. For example, the baseband apparatus 630 includes a processing element 631 and a storage element 632. The processing element 631 invokes a program stored in the storage element 632, to perform the method performed by the first device in the foregoing method embodiments. In addition, the baseband apparatus 630 may further include an interface 633, configured to exchange information with the radio frequency apparatus 620. The interface is, for example, a common public radio interface (CPRI). When the baseband apparatus 630 and the radio frequency apparatus 620 are physically deployed together, the interface may be an intra-board interface or an inter-board interface. The board herein is a circuit board.

In another implementation, the units shown in FIG. 22 may be one or more processing elements configured to implement the foregoing method performed by the relay device. The processing elements are disposed on the baseband apparatus 630. The processing element herein may be an integrated circuit, for example, one or more application-specific integrated circuits (ASIC), one or more digital signal processor (DSP), or one or more field-programmable gate arrays (FPGA). The integrated circuits may be integrated together to form a chip.

For example, the units shown in FIG. 22 may be integrated and implemented in a form of a system-on-a-chip (SOC). For example, the baseband apparatus 630 includes a SOC chip, configured to implement the foregoing method. A processing element 631 and a storage element 632 may be integrated into the chip, and the processing element 631 invokes the program stored in the storage element 632, to implement the foregoing method performed by the network device or the function of each unit shown in FIG. 22. Alternatively, one or more (including two) integrated circuits may be integrated into the chip, to implement the foregoing method performed by the first device or the function of each unit shown in FIG. 22. Alternatively, with reference to the foregoing implementation, functions of some units may be implemented by invoking the program by the processing element, and functions of some units may be implemented in a form of an integrated circuit.

In conclusion, the foregoing apparatus includes one or more (including two) processing elements and storage elements, and the processing element is configured to perform the method performed by the first device provided in the foregoing embodiments. The processing element may perform, in a first manner, namely, in a manner of executing the program stored in the storage element, some or all of the steps performed by the first device in the foregoing method embodiments; or may perform, in a second manner, namely, in a manner of combining an integrated logical circuit of hardware in the processing element with an instruction, some or all of the steps performed by the first device in the foregoing method embodiments; or certainly may perform, by combining the first manner and the second manner, some or all of the steps performed by the first device in the foregoing method embodiments.

As described above, the processing element herein may be a general purpose processor, for example, a central processing unit (CPU), or may be configured as one or more integrated circuits for performing the foregoing method, for example, one or more application-specific integrated circuits (ASIC), one or more microprocessors (DSP), or one or more field programmable gate arrays (FPGA).

The storage element may be one memory, or may be a general name of a plurality of storage elements.

Figure 27:
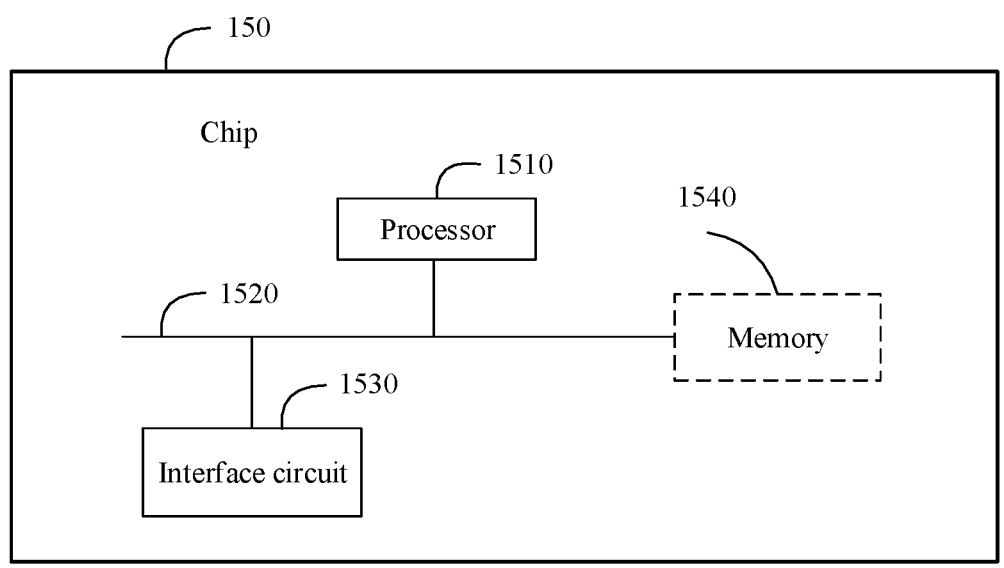
FIG. 27 is a schematic structural diagram of a chip according to another embodiment of this application.

FIG. 27 is a schematic structural diagram of a chip 150 according to an embodiment of the present invention. The chip 150 includes one or more (including two) processors 1510 and an interface circuit 1530.

Optionally, the chip 150 further includes a memory 1540. The memory 1540 may include a read-only memory and a random access memory, and provide an operation instruction and data for the processor 1510. A part of the memory 1540 may further include a non-volatile random access memory (NVRAM).

In some implementations, the memory 1540 stores the following elements: an executable module or a data structure, or a subset thereof, or an extended set thereof:

In this embodiment of the present invention, a corresponding operation is performed by invoking the operation instruction stored in the memory 1540 (where the operation instruction may be stored in an operating system).

In a possible implementation, chips used by a first management network element and a first device are similar, and different apparatuses may use different chips to implement respective functions.

The processor 1510 controls operations of the first management network element and the first device, and the processor 1510 may also be referred to as a central processing unit (CPU). The memory 1540 may include a read-only memory and a random access memory, and provide an instruction and data for the processor 1510. A part of the memory 1540 may further include a non-volatile random access memory (NVRAM). For example, during application, the memory 1540, the interface circuit 1530, and the memory 1540 are coupled together through a bus system 1520. The bus system 1520 may further include a power bus, a control bus, a status signal bus, and the like in addition to a data bus. However, for clear description, various types of buses in FIG. 27 are marked as the bus system 1520.

The method disclosed in the foregoing embodiments of the present invention may be applied to the processor 1510, or implemented by the processor 1510. The processor 1510 may be an integrated circuit chip and has a signal processing capability. In an implementation process, the steps of the foregoing method may be implemented by using a hardware integrated logical circuit in the processor 1510, or by using an instruction in a form of software. The processor 1510 may be a general purpose processor, a digital signal processor (DSP), an application-specific integrated circuit (ASIC), a field programmable gate array (FPGA) or another programmable logical device, a discrete gate or transistor logic device, or a discrete hardware component. The processor 1510 may implement or perform the methods, the steps, and logical block diagrams that are disclosed in the embodiments of the present invention. The general purpose processor may be a microprocessor, or the processor may be any conventional processor or the like. The steps of the method disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1540, and the processor 1510 reads information in the memory 1540 and completes the steps of the foregoing method in combination with hardware of the processor.

Optionally, the interface circuit 1530 is configured to perform the receiving and sending steps of the first management network element and the first device in the embodiments shown in FIG. 14, FIG. 15, FIG. 16, FIG. 18, FIG. 19, and FIG. 20.

The processor 1510 is configured to perform the processing steps of the first device in the embodiments shown in FIG. 14, FIG. 15, FIG. 16, FIG. 18, FIG. 19, and FIG. 20.

In the foregoing embodiment, the instruction that is stored in the memory and that is to be executed by the processor may be implemented in a form of a computer program product. The computer program product may be written into the memory in advance, or may be downloaded in a form of software and installed in the memory.

The computer program product includes one or more computer instructions. When the computer program instructions are loaded and executed on a computer, the procedure or functions according to the embodiments of this application are all or partially generated. The computer may be a general purpose computer, a special purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state drive or solid-state disk (SSD)), or the like.

According to one aspect, a computer-readable storage medium is provided. The computer-readable storage medium stores an instruction, and when the instruction is run, a first management network element or a chip applied to a first management network element is enabled to perform S101, S1011, S107, S102, S205, S302, S105, S206, and S303 in the embodiments, and/or another process that is used for the technology described in this specification and that is performed by the first management network element or the chip applied to the first network element.

According to another aspect, a computer storage medium is provided. The computer-readable storage medium stores an instruction, and when the instruction is run, a first device or a chip applied to a first device is enabled to perform S103, S201, S104, S202, S106, S207, and S304 in the embodiments, and/or another process that is used for the technology described in this specification and that is performed by the first device or the chip applied to the first device.

The foregoing readable storage medium may include: any medium that can store program code, such as a USB flash drive, a removable hard disk, a read-only memory, a random access memory, a magnetic disk, or an optical disc.

According to one aspect, a computer program product including an instruction is provided. The computer program product stores the instruction, and when the instruction is run, a first management network element or a chip applied to a first management network element is enabled to perform S101, S1011, S107, S102, S205, S302, S105, S206, and S303 in the embodiments, and/or another process that is used for the technology described in this specification and that is performed by the first management network element or the chip applied to the first network element.

According to another aspect, a computer program product including an instruction is provided. The computer program product stores the instruction, and when the instruction is run, a first device or a chip applied to a first device is enabled to perform S103, S201, S104, S202, S106, S207, and S304 in the embodiments, and/or another process that is used for the technology described in this specification and that is performed by the first device or the chip applied to the first device.

According to one aspect, a chip is provided. The chip is applied to a first management network element, the chip includes one or more (including two) processors and an interface circuit, the interface circuit is interconnected to the one or more (including two) processors through a line, and the processor is configured to run an instruction to perform S101, S1011, S107, S102, S205, S302, S105, S206, and S303 in the embodiments, and/or another process that is used for the technology described in this specification and that is performed by the first management network element.

According to another aspect, a chip is provided. The chip is applied to a first device, the chip includes one or more (including two) processors and an interface circuit, the interface circuit is interconnected to the one or more (including two) processors through a line, and the processor is configured to run an instruction to perform S103, S201, S104, S202, S106, S207, and S304 in the embodiments, and/or another process that is used for the technology described in this specification and that is performed by the first device.

In addition, this application further provides a communications system. The communications system includes the communications apparatus shown in FIG. 21, FIG. 23, and FIG. 24, and the communications apparatus shown in FIG. 22, FIG. 25, and FIG. 26.

According to the communications system provided in this application, the first device obtains the information about the first radio bearer of the terminal in the first network, and sends the obtained information about the first radio bearer of the terminal in the first network to the first management network element, so that after receiving the information about the first radio bearer, the first management network element may determine the mapping relationship between the first radio bearer and the second radio bearer of the first device in the second network based on the QoS parameter included in the information about the first radio bearer. In this way, in a different-standard scenario, a service of the terminal can be mapped to the corresponding bearers in the first network and the second network for transmission, thereby improving service transmission quality.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. The foregoing descriptions are merely specific implementations of this application.

In addition, functional units in the embodiments of this application may be integrated into one processing unit, or each of the units may exist alone physically, or two or more units may be integrated into one unit.

When functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, applied to a wireless backhaul system, wherein the wireless backhaul system comprises a first network and a second network, the first network and the second network use different radio access technologies (RATs), a terminal and an access network device in the wireless backhaul system communicate with each other through a first device in the wireless backhaul system, the first device communicates with the terminal by using a RAT corresponding to the first network, the first device communicates with the access network device by using a RAT corresponding to the second network, the second network comprises a first management network element, and the first management network element is configured to control session management of the first device in the second network, and wherein the method comprises:

obtaining, by the first management network element, information about a first radio bearer of the terminal in the first network, wherein the information about the first radio bearer is used to indicate the first radio bearer, wherein the information about the first radio bearer comprises an identifier of the first radio bearer and a QoS parameter corresponding to the identifier of the first radio bearer;

searching, by the first management network element and based on the QoS parameter, the second network for a QoS profile parameter associated with an identifier of a second radio bearer, wherein the searching comprises:

determining that a difference between the QoS parameter and the QoS profile parameter is less than a threshold; and in response to determining that the difference between the QoS parameter and the QoS profile parameter is less than the threshold, selecting the QoS profile parameter; and determining, by the first management network element, a mapping relationship between the identifier of the first radio bearer and the identifier of the second radio bearer based on the information about the first radio bearer, wherein the second radio bearer is a radio bearer of the first device in the second network.

2. The method according to claim 1, wherein the obtaining, by the first management network element, information about a first radio bearer of the terminal in the first network comprises:

obtaining, by the first management network element, the information about the first radio bearer of the terminal in the first network from the first device.

3. The method according to claim 1, wherein the obtaining, by the first management network element, information about a first radio bearer of the terminal in the first network comprises:

obtaining, by the first management network element, the information about the first radio bearer of the terminal in the first network from a core network control plane network element of the terminal in the first network.

4. The method according to claim 1, wherein before the determining, by the first management network element, a mapping relationship between the first radio bearer and a second radio bearer based on the information about the first radio bearer, the method further comprises:

obtaining, by the first management network element, information about the second radio bearer of the first device in the second network, wherein the information about the second radio bearer comprises the identifier of the second radio bearer and a quality of service (QoS) parameter corresponding to the identifier of the second radio bearer.

5. The method according to claim 4, wherein the determining, by the first management network element, a mapping relationship between the identifier of the first radio bearer and the identifier of the second radio bearer based on the information about the first radio bearer comprises:

in response to determining that the QoS parameter corresponding to the identifier of the first radio bearer matches the QoS profile parameter, determining, by the first management network element, that the mapping relationship exists between the identifier of the first radio bearer and the identifier of the second radio bearer.

6. The method according to claim 4, wherein the determining, by the first management network element, a mapping relationship between the identifier of the first radio bearer and the identifier of the second radio bearer based on the information about the first radio bearer comprises:

in response to determining that no QoS profile parameter in the second network matches the QoS parameter corresponding to the identifier of the first radio bearer:

triggering, by the first management network element and based on the QoS parameter corresponding to the identifier of the first radio bearer, the first device to set up the second radio bearer in the second network, wherein the second radio bearer is indicated by the identifier of the second radio bearer and an QoS profile parameter corresponding to the identifier of the second radio bearer; and determining, by the first management network element, that the mapping relationship exists between the identifier of the first radio bearer and the identifier of the second radio bearer.

7. The method according to claim 1, wherein the method further comprises:

sending, by the first management network element, the mapping relationship between the first radio bearer and the second radio bearer to the first device or the access network device.

8. The method according to claim 1, wherein the RAT corresponding to the first network comprises a LTE network, the RAT corresponding to the second network comprises a 5G new radio (NR) network.

9. A communications apparatus, applied to a wireless backhaul system, wherein the communications apparatus is a first management network element or a chip applied to a first management network element, the wireless backhaul system comprises a first network and a second network, the first network and the second network use different radio access technologies (RATs), a terminal and an access network device in the wireless backhaul system communicate with each other through a first device in the wireless backhaul system, the first device communicates with the terminal by using a RAT corresponding to the first network, the first device communicates with the access network device by using a RAT corresponding to the second network, and the communications apparatus is configured to control session management of the first device in the second network, and wherein the communications apparatus comprises at least one processor and a non-transitory memory storing a program comprising instructions to be executed on the at least one processor, wherein the instructions cause the at least one processor to:
obtain information about a first radio bearer of the terminal in the first network, wherein the information about the first radio bearer is used to indicate the first radio bearer, wherein the information about the first radio bearer comprises an identifier of the first radio bearer and a QoS parameter corresponding to the identifier of the first radio bearer;
search, by the first management network element and based on the QoS parameter, the second network for a QoS profile parameter associated with an identifier of a second radio bearer, wherein the searching comprises:
determining that a difference between the QoS parameter and the QoS profile parameter is less than a threshold; and
in response to determining that the difference between the QoS parameter and the QoS profile parameter is less than the threshold, selecting the QoS profile parameter; and
determine a mapping relationship between the identifier of the first radio bearer and the identifier of the second radio bearer based on the information about the first radio bearer, wherein the second radio bearer is a radio bearer of the first device in the second network.

10. The communications apparatus according to claim 9, wherein the instructions cause the at least one processor to obtain the information about the first radio bearer of the terminal in the first network from the first device.

11. The communications apparatus according to claim 9, wherein to obtain information about a first radio bearer of the terminal in the first network, the instructions, when executed by the at least one processor, cause the at least one processor to:
obtain the information about the first radio bearer of the terminal in the first network from a core network control plane network element of the terminal in the first network.

12. The communications apparatus according to claim 9, wherein the program comprises further instructions that cause the at least one processor to obtain information about the second radio bearer of the first device in the second network, wherein the information about the second radio bearer comprises the identifier of the second radio bearer and a quality of service (QoS) parameter corresponding to the identifier of the second radio bearer.

13. The communications apparatus according to claim 12, wherein the program comprises further instructions that cause the at least one processor to:
in response to determining that the QoS parameter corresponding to the identifier of the first radio bearer matches the QoS profile parameter, determine that the mapping relationship exists between the identifier of the first radio bearer and the identifier of the second radio bearer.

14. The communications apparatus according to claim 12, wherein the program comprises further instructions that cause the at least one processor to:
in response to determining that no QoS profile parameter in the second network matches the QoS parameter corresponding to the identifier of the first radio bearer:
trigger, based on the QoS parameter corresponding to the identifier of the first radio bearer, the first device to set up the second radio bearer in the second network, wherein the second radio bearer is indicated by the identifier of the second radio bearer and an QoS profile parameter corresponding to the identifier of the second radio bearer; and
determine that the mapping relationship exists between the identifier of the first radio bearer and the identifier of the second radio bearer.

15. The communications apparatus according to claim 9, the program comprises further instructions that cause the at least one processor to instruct a transmitter to send the mapping relationship between the first radio bearer and the second radio bearer to the first device or the access network device.

16. A wireless backhaul system, wherein the wireless backhaul system comprises a first network and a second network, the first network and the second network use different radio access technologies (RATs), a terminal and an access network device in the wireless backhaul system communicate with each other through a first device in the wireless backhaul system, the first device communicates with the terminal by using a RAT corresponding to the first network, the first device communicates with the access network device by using a RAT corresponding to the second network, the second network comprises a first management network element, and the first management network element is configured to control session management of the first device in the second network, wherein:
the first device is configured to:
obtain information about a first radio bearer of the terminal in the first network, wherein the information about the first radio bearer is used to indicate the first radio bearer; and
send the information about the first radio bearer to the first management network element; and
the first management network element is configured to:
obtain the information about the first radio bearer of the terminal in the first network, wherein the information about the first radio bearer comprises an identifier of the first radio bearer and a QoS parameter corresponding to the identifier of the first radio bearer;
search, based on the QoS parameter, the second network for a QoS profile parameter associated with an identifier of a second radio bearer, wherein the searching comprises:
determining that a difference between the QoS parameter and the QoS profile parameter is less than a threshold; and
in response to determining that the difference between the QoS parameter and the QoS profile parameter is less than the threshold, selecting the QoS profile parameter; and
determine a mapping relationship between the identifier of the first radio bearer and the identifier of the second radio bearer based on the information about the first radio bearer, wherein the second radio bearer is a radio bearer of the first device in the second network.

17. The system according to claim 16, wherein the first management network element is further configured to obtain information about the second radio bearer of the first device in the second network, wherein the information about the second radio bearer comprises the identifier of the second radio bearer and a quality of service (QoS) parameter corresponding to the identifier of the second radio bearer.

18. The system according to claim 17, wherein the first management network element is configured to:
  in response to determining that the QoS parameter corresponding to the identifier of the first radio bearer matches the QoS profile parameter, determine that the mapping relationship exists between the identifier of the first radio bearer and the identifier of the second radio bearer.

19. The system according to claim 17, wherein the first management network element is configured to:
  in response to determining that no QoS profile parameter in the second network matches the QoS parameter corresponding to the identifier of the first radio bearer:
    trigger, based on the QoS parameter corresponding to the identifier of the first radio bearer, the first device to set up the second radio bearer in the second network, wherein the second radio bearer is indicated by the identifier of the second radio bearer and an QoS profile parameter corresponding to the identifier of the second radio bearer; and
    determine that the mapping relationship exists between the identifier of the first radio bearer and the identifier of the second radio bearer.

20. The system according to claim 16, wherein the first management network element is further configured to send the mapping relationship between the first radio bearer and the second radio bearer to the first device or the access network device.

* * * * *